US010584252B2

(12) United States Patent
Wakabayashi et al.

(10) Patent No.: US 10,584,252 B2
(45) Date of Patent: Mar. 10, 2020

(54) INKJET PRINTING METHOD AND WATER-BASED INK

(71) Applicant: KAO CORPORATION, Tokyo (JP)

(72) Inventors: Yuki Wakabayashi, Izumiotsu (JP); Hirotaka Takeno, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 15/738,766

(22) PCT Filed: Jun. 24, 2016

(86) PCT No.: PCT/JP2016/068833
§ 371 (c)(1),
(2) Date: Dec. 21, 2017

(87) PCT Pub. No.: WO2016/208721
PCT Pub. Date: Dec. 29, 2016

(65) Prior Publication Data
US 2018/0179405 A1 Jun. 28, 2018

(30) Foreign Application Priority Data
Jun. 25, 2015 (JP) .................... 2015-127598

(51) Int. Cl.
C09D 11/033 (2014.01)
B41M 5/00 (2006.01)
B41M 7/00 (2006.01)
B41J 11/00 (2006.01)
B41J 2/21 (2006.01)
C09D 11/322 (2014.01)
C09D 11/037 (2014.01)

(52) U.S. Cl.
CPC ........... C09D 11/033 (2013.01); B41J 2/2107 (2013.01); B41J 11/002 (2013.01); B41M 5/00 (2013.01); B41M 5/0023 (2013.01); B41M 7/009 (2013.01); C09D 11/037 (2013.01); C09D 11/322 (2013.01)

(58) Field of Classification Search
CPC ..................................................... C09D 11/30
See application file for complete search history.

(56) References Cited

U.S. PATENT DOCUMENTS

| 6,554,891 | B1 | 4/2003 | Momose et al. | |
| 6,951,376 | B2* | 10/2005 | Ishikawa | B41J 2/04531 347/102 |
| 8,511,811 | B2 | 8/2013 | Kakino et al. | |
| 8,770,733 | B2 | 7/2014 | Ohya et al. | |
| 2002/0157569 | A1 | 10/2002 | Takemoto et al. | |
| 2003/0177943 | A1 | 9/2003 | Auweter et al. | |
| 2006/0017759 | A1 | 1/2006 | Matsuzawa et al. | |
| 2006/0047013 | A1 | 3/2006 | Ito et al. | |
| 2006/0132522 | A1* | 6/2006 | Baker | B41J 25/308 347/14 |
| 2006/0232650 | A1 | 10/2006 | Sugimoto et al. | |
| 2009/0232989 | A1 | 9/2009 | Tojo | |
| 2009/0295847 | A1 | 12/2009 | Mukai et al. | |
| 2010/0028625 | A1 | 2/2010 | Kagata et al. | |
| 2010/0087595 | A1 | 4/2010 | Koganehira et al. | |
| 2010/0093900 | A1* | 4/2010 | Ohya | B41M 7/00 524/173 |
| 2010/0253735 | A1 | 10/2010 | Irita | |
| 2011/0063390 | A1* | 3/2011 | Takemoto | B41J 11/002 347/102 |
| 2011/0281032 | A1 | 11/2011 | Kagata et al. | |
| 2012/0040147 | A1 | 2/2012 | Komatsu et al. | |
| 2012/0252948 | A1* | 10/2012 | King | C09D 11/322 524/314 |
| 2013/0215175 | A1* | 8/2013 | Ozawa | C09D 11/30 347/13 |
| 2013/0307899 | A1 | 11/2013 | Saito et al. | |

(Continued)

FOREIGN PATENT DOCUMENTS

CN 1662378 A 8/2005
CN 101412865 A 4/2009
(Continued)

OTHER PUBLICATIONS

International Search Report for PCT/JP2016/068833 (PCT/ISA/210) dated Aug. 23, 2016.
U.S. Appl. No. 15/738,480, filed Dec. 20, 2017.
U.S. Appl. No. 15/738,487, filed Dec. 20, 2017.
Author Unknown, "Glycol Ethers E.O. Type P.O. Type Dialkyl," 6th edition, Nippon Nyukazai Co., Ltd., 2008, pp. 1-16 (17 pages total), with a partial English translation.
International Search Report for Application No. PCT/JP2016/068831 (Form PCT/ISA/210) dated Jul. 26, 2016.
International Search Report for Application No. PCT/JP2016/068832 (Form PCT/ISA/210) dated Aug. 23, 2016.
(Continued)

Primary Examiner — Shelby L Fidler
(74) Attorney, Agent, or Firm — Birch, Stewart, Kolasch & Birch, LLP

(57) ABSTRACT

The present invention relates to [1] an ink-jet printing method including a printing step of ejecting a water-based ink onto a surface of a printing medium to print characters or images thereon, in which the water-based ink includes a pigment (A), an organic solvent (B), a surfactant (C) and water; the organic solvent (B) includes at least a glycol ether (b-1), and the glycol ether has a viscosity of from 2.0 to 5.5 mPa·s as measured at 20° C. and a vapor pressure of from 0.03 to 6.0 hPa as measured at 20° C.; a content of a high-boiling organic solvent having a boiling point of not lower than 250° C. in the water-based ink is not more than 5% by mass; and a printing speed upon printing the characters or images on the printing medium is not less than 70 m/min in terms of a transportation speed of the printing medium, and [2] a water-based ink used in the inkjet printing method.

20 Claims, No Drawings

(56) References Cited

U.S. PATENT DOCUMENTS

| | | | |
|---|---|---|---|
| 2014/0085376 A1* | 3/2014 | Kato | B41J 2/16552 347/33 |
| 2015/0064423 A1 | 3/2015 | Ohmoto | |
| 2016/0032122 A1* | 2/2016 | Toda | C09D 11/322 347/20 |
| 2016/0130453 A1 | 5/2016 | Eguchi et al. | |
| 2017/0022379 A1 | 1/2017 | Loccufier et al. | |
| 2017/0247556 A1* | 8/2017 | Yokohama | B41J 11/002 |
| 2018/0002554 A1 | 1/2018 | Selmeczy et al. | |

FOREIGN PATENT DOCUMENTS

| | | |
|---|---|---|
| CN | 101426657 A | 5/2009 |
| CN | 105602344 A | 5/2016 |
| EP | 0386349 A1 | 9/1990 |
| EP | 2230281 A1 | 9/2010 |
| EP | 3 023 464 A2 | 5/2016 |
| EP | 3088481 A1 | 11/2016 |
| EP | 3239255 A1 | 11/2017 |
| EP | 3275949 A1 | 1/2018 |
| JP | 2-248474 A | 10/1990 |
| JP | 10-53741 A | 2/1998 |
| JP | 2002-60662 A | 2/2002 |
| JP | 2006-56234 A | 3/2006 |
| JP | 2006-298978 A | 11/2006 |
| JP | 2007-91905 A | 4/2007 |
| JP | 2007-91906 A | 4/2007 |
| JP | 2008-238485 A | 10/2008 |
| JP | 2009-197166 A | 9/2009 |
| JP | 2010-53328 A | 3/2010 |
| JP | 2010-240862 A | 10/2010 |
| JP | 2011-63630 A | 3/2011 |
| JP | 2011-74336 A | 4/2011 |
| JP | 2012-31246 A | 2/2012 |
| JP | 2012-140611 A | 7/2012 |
| JP | 2012-184376 A | 9/2012 |
| JP | 2013-59989 A | 4/2013 |
| JP | 2013-112801 A | 6/2013 |
| JP | 2013-202956 A | 10/2013 |
| JP | 2014-205770 A | 10/2014 |
| JP | 2015-13990 A | 1/2015 |
| JP | 2015-48435 A | 3/2015 |
| JP | 2015-85568 A | 5/2015 |
| WO | WO 00/71628 A1 | 11/2000 |
| WO | WO 2010/038457 A1 | 4/2010 |
| WO | WO 2012/070243 A1 | 5/2012 |
| WO | WO 2014/119769 A1 | 8/2014 |
| WO | WO 2016/104294 A1 | 6/2016 |

OTHER PUBLICATIONS

Extended European Search Report for European Application No. 16814488.9, dated Nov. 12, 2018.

U.S. Office Action for U.S. Appl. No. 15/738,487, dated Aug. 16, 2019.

Extended European Search Report for European Application No. 16814489.7, dated Dec. 3, 2018.

Extended European Search Report for European Application No. 16814490.5, dated Nov. 26, 2018.

* cited by examiner

INKJET PRINTING METHOD AND WATER-BASED INK

FIELD OF THE INVENTION

The present invention relates to an ink-jet printing method and a water-based ink used in the ink-jet printing method.

BACKGROUND OF THE INVENTION

In ink-jet printing methods, droplets of ink are directly projected onto a printing medium from fine nozzles and allowed to adhere to the printing medium to form characters or images thereon and thereby obtain printed materials. The ink-jet printing methods have now been employed not only in printing applications for ordinary consumers but also recently in commercial and industrial printing applications because of various advantages such as easiness of full coloration, low cost, non-contact with printed characters or images, etc.

One of advantages of using the ink-jet printing methods in the commercial and industrial printing applications resides in that since no printing plate is required unlike the conventional analog printing methods, the ink-jet printing methods can be adaptable for production of a small number of prints, i.e., can be used in the applications of on-demand printing such as valuable printing, etc.

In the commercial and industrial printing applications, it has been demanded to obtain printed materials with high productivity as compared to the printing applications for consumers, so that high-speed printing has been carried out in these applications. To cope with the high-speed printing, a print head of a line head printing type has been developed. In the conventional serial head printing method, it has been required to operate the print head (nozzles) plural times. On the other hand, in the line head printing method, only a printing roll paper is scanned while keeping the print head stationary, and it is therefore possible to realize the high-speed printing.

For example, JP 2008-238485A (Patent Literature 1) discloses an ink-jet printing method in which a water-based ink including a pigment and an organic solvent such as dipropylene glycol monomethyl ether is ejected in the form of droplets having a volume of not more than 3 pL from funnel-shaped nozzles arranged in a line print head.

JP 2015-13990A (Patent Literature 2) discloses a water-based ink for ink-jet printing which is used upon conducting sheet printing by a serial head printing method, and includes pigment-containing water-insoluble polymer particles A, water-insoluble polymer particles B and an organic solvent C in which a water-insoluble polymer constituting the water-insoluble polymer particles A contains a constitutional unit derived from a specific hydrophilic nonionic monomer, and a weighted mean value of a boiling point of the organic solvent C is not higher than 250° C.

SUMMARY OF THE INVENTION

The present invention relates to an ink-jet printing method including a printing step of ejecting a water-based ink onto a surface of a printing medium to print characters or images thereon, in which the water-based ink includes a pigment (A), an organic solvent (B), a surfactant (C) and water; the organic solvent (B) includes at least a glycol ether (b-1), and the glycol ether (b-1) has a viscosity of not less than 2.0 mPa·s and not more than 5.5 mPa·s as measured at 20° C. and a vapor pressure of not less than 0.03 hPa and not more than 6.0 hPa as measured at 20° C.; a content of a high-boiling organic solvent having a boiling point of not lower than 250° C. in the water-based ink is not more than 5% by mass; and a printing speed upon printing the characters or images on the printing medium is not less than 70 m/min in terms of a transportation speed of the printing medium, as well as a water-based ink used in the ink-jet printing method.

DETAILED DESCRIPTION OF THE INVENTION

In the line head printing methods, although it is possible to realize the high-speed printing, a printing paper is caused to pass through the print head (hereinafter also referred to merely as a "head") only one time, so that even if only one of nozzles in the print head suffers from defective ejection of the ink, the printed characters or images tend to instantly undergo deterioration in image quality thereof. For this reason, in the line head printing methods, it has been required that the ink exhibits higher-level ejection stability.

When conducting the high-speed printing, it is necessary to well control a drive frequency of the print head and a resolution of the characters or images printed. For example, as the printing speed is increased, the number of ink droplets impacted on the printing medium per a unit area thereof is reduced. For this reason, it is necessary to increase an amount of the ink per one ink droplet ejected. Therefore, the size of a dot of the ink becomes large, so that the resulting printed characters or images tend to exhibit poor image quality with a low resolution and therefore tend to be deteriorated in printing quality.

On the other hand, when conducting high resolution printing with a small amount of ink droplets, the printing speed tends to be reduced. If the drive frequency of the print head, in particular, the line print head, is increased, the printing speed can be increased even when the resolution of the printed characters or images becomes high. However, when the drive frequency of the print head is increased, it may be difficult to maintain an ejection speed of ink droplets as well as stability of a meniscus of the ink in nozzles of the print head, so that there tends to occur such a problem that the ink is deteriorated in continuous ejection stability. Furthermore, in the case where the printing is conducted using a small amount of ink droplets, there also tends to occur such a problem that aggregates of the ink are formed in the ejection nozzles and cause clogging of the nozzles.

The high-speed printing also has such an additional problem that the printed surface is hardly dried sufficiently. In the high-speed printing using a roll paper, a drying velocity of the ink tends to be inferior to a velocity of transportation of the roll paper, so that the ink tends to be hardly dried sufficiently, and defects such as contamination of a transportation roller and peeling or rub-off of the ink on the printed surface tend to be caused between the transportation roller and the printed surface.

To solve the problem concerning the insufficient drying of the ink, the use of a low-boiling solvent as a component of the ink or the use of a surface treating agent in combination with the ink has been proposed. However, when using the low-boiling solvent, there tends to occur such a problem that the ink is dried and thickened inside of the print head so that the ink is deteriorated in ejection properties. Whereas, when using the surface treating agent in combination, it may be required to introduce a coating system for the surface treating agent into an ink-jet printing apparatus, so that disadvantages such as increase in cost and size of the apparatus tend to be caused.

On the other hand, in the non-high-speed printing methods, although the roller transfer contamination is hardly caused even when using the conventional inks, there tends to occur such a problem that the methods are deteriorated in productivity, or suffer from intercolor bleeding (mixing between colors) on a printing paper.

The present invention relates to an ink-jet printing method capable of attaining excellent ejection stability of ink and obtaining good printed materials that are free of roller transfer contamination and intercolor bleeding even in the high-speed printing required in commercial printing applications, and a water-based ink used in the ink-jet printing method.

The present inventors have found that even in the high-speed printing (for example, at a printing speed of not less than 70 m/min) required in commercial printing applications, when using a water-based ink including a glycol ether having specific viscosity and vapor pressure, it is possible to attain excellent ejection stability of the ink and obtain good printed materials that are free of roller transfer contamination and intercolor bleeding.

That is, the present invention relates to the following aspects [1] and [2].

[1] An ink-jet printing method including a printing step of ejecting a water-based ink onto a surface of a printing medium to print characters or images thereon, in which:
the water-based ink includes a pigment (A), an organic solvent (B), a surfactant (C) and water;
the organic solvent (B) includes at least a glycol ether (b-1), and the glycol ether (b-1) has a viscosity of not less than 2.0 mPa·s and not more than 5.5 mPa·s as measured at 20° C. and a vapor pressure of not less than 0.03 hPa and not more than 6.0 hPa as measured at 20° C.;
a content of a high-boiling organic solvent having a boiling point of not lower than 250° C. in the water-based ink is not more than 5% by mass; and
a printing speed upon printing the characters or images on the printing medium is not less than 70 m/min in terms of a transportation speed of the printing medium.

[2] A water-based ink including a pigment (A), an organic solvent (B), a surfactant (C) and water, in which:
the organic solvent (B) includes at least a glycol ether (b-1), and the glycol ether (b-1) has a viscosity of not less than 2.0 mPa·s and not more than 5.5 mPa·s as measured at 20° C. and a vapor pressure of not less than 0.03 hPa and not more than 6.0 hPa as measured at 20° C.;
the glycol ether (b-1) is at least one compound selected from the group consisting of diethylene glycol methyl ether, ethylene glycol isopropyl ether, ethylene glycol propyl ether and diethylene glycol isopropyl ether; and
a content of a high-boiling organic solvent having a boiling point of not lower than 250° C. in the water-based ink is not more than 5% by mass.

According to the present invention, there are provided an ink-jet printing method capable of attaining excellent ejection stability of ink and obtaining good printed materials that are free of roller transfer contamination and intercolor bleeding even in the high-speed printing required in commercial printing applications, and a water-based ink used in the ink-jet printing method.

[Water-Based Ink]

The water-based ink of the present invention (hereinafter also referred to merely as an "ink") includes a pigment (A), an organic solvent (B), a surfactant (C) and water, in which the organic solvent (B) includes at least a glycol ether (b-1), and the glycol ether (b-1) has a viscosity of not less than 2.0 mPa·s and not more than 5.5 mPa·s as measured at 20° C. and a vapor pressure of not less than 0.03 hPa and not more than 6.0 hPa as measured at 20° C.; and a content of a high-boiling organic solvent having a boiling point of not lower than 250° C. in the water-based ink is not more than 5% by mass, and further the glycol ether (b-1) is preferably at least one compound selected from the group consisting of diethylene glycol methyl ether, ethylene glycol isopropyl ether, ethylene glycol propyl ether and diethylene glycol isopropyl ether.

The water-based ink of the present invention is capable of obtaining good printed materials that are free of roller transfer contamination and intercolor bleeding even in the high-speed printing required in commercial printing applications, and therefore can be suitably used as a water-based ink for flexo printing, gravure printing or ink-jet printing. In particular, the water-based ink of the present invention is excellent in ejection stability, and therefore can be preferably used as a water-based ink for ink-jet printing.

Meanwhile, the term "printing" as used in the present specification is a concept that includes printing or typing for recording characters or images, and the term "printed material" as used in the present specification is a concept that includes printed matters or typed materials on which characters or images are printed or recorded. In addition, the term "water-based" as used herein means that water has a largest content among components of a medium contained in the ink.

According to the high-speed printing method using the water-based ink of the present invention, there can be obtained such an advantageous effect that the ink is excellent in ejection stability even after a predetermined time is elapsed without ejecting the ink from nozzles (hereinafter also referred to merely as "ejection stability"), and it is possible to obtain good printed materials that are free of roller transfer contamination and intercolor bleeding. The reason why the aforementioned advantageous effect can be attained by the present invention is considered as follows, though it is not clearly determined yet.

That is, the ink for ink-jet printing is usually compounded with a polymer dispersant. However, if the ink in nozzles is allowed to stand in a non-ejected state for a predetermined time after last ejecting the ink from the nozzles, there tends to occur such a problem that the polymer dispersant particles are aggregated and deposited within the nozzles owing to drying of the ink in the nozzles, so that the ink suffers from ejection defects when ejecting the ink again from the nozzles.

In the present invention, the organic solvent (B) contains a glycol ether having specific viscosity and vapor pressure. Since the glycol ether has adequate viscosity and is excellent in flow characteristics at a high drive frequency of the print head, it is considered that the glycol ether contributes to improvement in ejection stability of the ink upon conducting the high-speed printing at a printing speed of not less than 70 m/min. In addition, since the glycol ether has adequate vapor pressure, it is considered that drying of the ink and therefore occurrence of deposition of aggregates of the ink in the nozzles can be suppressed. For these reasons, it is considered that the ink can be further improved in ejection stability upon the high-speed printing.

Furthermore, since the viscosity and the vapor pressure of the glycol ether lie within the respective adequate ranges, the ink is free of insufficient drying of the ink on the printed surface, and occurrence of roller contamination and peeling or rub-off of the ink on the printed surface can be suppressed, so that it is possible to obtain good printed materials that are free of roller transfer contamination and intercolor bleeding.

<Water-Based Ink>

The water-based ink used in the present invention includes a pigment (A), an organic solvent (B), a surfactant (C) and water.

<Pigment (A)>

The pigment (A) is advantageously used from the standpoint of improving water resistance and weathering resistance of the resulting printed materials, as compared to dyes.

The pigment (A) used in the present invention may be either an inorganic pigment or an organic pigment. The inorganic or organic pigment may also be used in combination with an extender pigment, if required.

Specific examples of the inorganic pigment include carbon blacks, metal oxides and the like. Of these inorganic pigments, in particular, carbon blacks are preferably used for black inks. The carbon blacks may include furnace blacks, thermal lamp blacks, acetylene blacks and channel blacks.

Specific examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

The hue of the organic pigment used in the present invention is not particularly limited, and there may be used any chromatic color pigment having a yellow color, a magenta color, a cyan color, a blue color, a red color, an orange color, a green color, etc.

Specific examples of the preferred organic pigments include one or more pigments selected from the group consisting of commercially available products marketed under the tradenames of C.I. Pigment Yellow, C.I. Pigment Red, C.I. Pigment Orange, C.I. Pigment Violet, C.I. Pigment Blue and C.I. Pigment Green with various product numbers.

Examples of the extender pigment include silica, calcium carbonate and talc.

The pigment (A) may be included in the water-based ink in the form of a self-dispersible pigment, a pigment dispersed in the water-based ink with a polymer dispersant, or pigment-containing water-insoluble polymer particles.

Among them, the pigment (A) to be included in the water-based ink is preferably in the form of the pigment (A)-containing water-insoluble polymer particles (hereinafter also referred to merely as "pigment-containing polymer particles") from the viewpoint of obtaining good printed materials that are free of roller transfer contamination to a printing medium and intercolor bleeding.

[Pigment-Containing Water-Insoluble Polymer Particles (Pigment-Containing Polymer Particles)]

(Water-Insoluble Polymer)

The water-insoluble polymer (hereinafter also referred to merely as a "polymer") has not only a function as a pigment dispersant capable of exhibiting the effect of dispersing the pigment in the water-based ink, but also a function as a fusing agent for fusing the resulting ink on a printing medium.

The term "water-insoluble" as used herein means that when a polymer is dried to a constant weight at 105° C. for 2 hours and then dissolved in 100 g of water at 25° C., the solubility in water of the polymer is not more than 10 g. The solubility in water of the polymer is preferably not more than 5 g and more preferably not more than 1 g. In the case where the water-insoluble polymer is in the form of an anionic polymer, the solubility means a solubility of the polymer whose anionic groups are neutralized completely (i.e., 100%) with sodium hydroxide. On the other hand, in the case where the water-insoluble polymer is in the form of a cationic polymer, the solubility means a solubility of the polymer whose cationic groups are neutralized completely (i.e., 100%) with hydrochloric acid.

Examples of the configuration of the water-insoluble polymer being present in the ink include the configuration in which the water-insoluble polymer is adsorbed onto the pigment, the configuration in which the pigment is enclosed (encapsulated) in the water-insoluble polymer, and the configuration in which the water-insoluble polymer is not adsorbed onto the pigment. In the present invention, from the viewpoint of improving dispersion stability of the pigment, among these configurations, preferred is the configuration in which the water-insoluble polymer is present in the form of pigment-containing polymer particles, and more preferred is the configuration in which the pigment is enclosed (encapsulated) in the water-insoluble polymer.

Examples of the polymer used in the present invention include polyesters, polyurethanes and vinyl-based polymers. Among these polymers, from the viewpoint of improving storage stability of the resulting ink, preferred are vinyl-based polymers obtained by addition-polymerizing a vinyl monomer (such as vinyl compounds, vinylidene compounds and vinylene compounds).

The vinyl-based polymer used in the present invention is preferably a vinyl-based polymer that is produced by copolymerizing a monomer mixture containing (a) an ionic monomer (hereinafter also referred to merely as a "component (a)") and (b) a hydrophobic monomer (hereinafter also referred to merely as a "component (b)") (such a mixture is hereinafter also referred to merely as a "monomer mixture"). The vinyl-based polymer contains a constitutional unit derived from the component (a) and a constitutional unit derived from the component (b). In particular, the vinyl-based polymer preferably further contains a constitutional unit derived from (c) a macromonomer (hereinafter also referred to merely as a "component (c)").

[(a) Ionic Monomer]

The ionic monomer (a) is preferably used as a monomer component of the water-insoluble polymer from the viewpoint of improving dispersion stability of the pigment-containing polymer particles in the ink. Examples of the ionic monomer include anionic monomers and cationic monomers. Among these monomers, preferred are anionic monomers. Meanwhile, the ionic monomer may also include those monomers that have no ionicity under neutral conditions, such as acids and amines, but are rendered ionic under acid or alkaline conditions.

Examples of the anionic monomers include carboxylic acid monomers, sulfonic acid monomers and phosphoric acid monomers.

Specific examples of the carboxylic acid monomers include acrylic acid, methacrylic acid, crotonic acid, itaconic acid, maleic acid, fumaric acid, citraconic acid and 2-methacryloyloxymethylsuccinic acid.

Among the anionic monomers, from the viewpoint of improving dispersion stability of the pigment-containing polymer particles in the ink, preferred are the carboxylic acid monomers, and more preferred is at least one monomer selected from the group consisting of acrylic acid and methacrylic acid.

Examples of the cationic monomers include N,N-dimethylaminoethyl methacrylate and N,N-dimethylaminoethyl acrylamide.

[(b) Hydrophobic Monomer]

The hydrophobic monomer (b) is preferably used as a monomer component of the water-insoluble polymer from the viewpoint of improving dispersion stability of the pigment-containing polymer particles in the ink. Examples of the hydrophobic monomer include alkyl (meth)acrylic acid esters and aromatic group-containing monomers.

The alkyl (meth)acrylic acid esters are preferably those alkyl (meth)acrylic acid esters containing an alkyl group having 1 to 22 carbon atoms and preferably 6 to 18 carbon atoms. Examples of the alkyl (meth)acrylic acid esters include methyl (meth)acrylate, ethyl (meth)acrylate, (iso) propyl (meth)acrylate, (iso- or tertiary-)butyl (meth)acrylate, (iso)amyl (meth)acrylate, cyclohexyl (meth)acrylate, 2-ethylhexyl (meth)acrylate, (iso)octyl (meth)acrylate, (iso) decyl (meth)acrylate, (iso)dodecyl (meth)acrylate and (iso) stearyl (meth)acrylate.

Meanwhile, the terms "(iso- or tertiary-)" and "(iso)" as used herein mean both the structure in which any of the groups expressed by "iso or tertiary" and "iso" is present, and the structure in which any of these groups is not present (i.e., normal). In addition, the term "(meth)acrylic acid" means at least one compound selected from the group consisting of acrylic acid and methacrylic acid, and the term "(meth)acrylic acid ester" means at least one compound selected from the group consisting of an acrylic acid ester and a methacrylic acid ester. Therefore, the term "(meth) acrylate" means at least one compound selected from the group consisting of an acrylate and a methacrylate. These terms are hereinafter defined in the same way.

The aromatic group-containing monomer is preferably a vinyl monomer containing an aromatic group having 6 to 22 carbon atoms which may contain a substituent group having a hetero atom, and more preferably a styrene-based monomer or an aromatic group-containing (meth)acrylic acid ester.

Specific examples of the preferred styrene-based monomer include styrene, 2-methyl styrene and divinyl benzene. Among these styrene-based monomers, more preferred is styrene.

Specific examples of the preferred aromatic group-containing (meth)acrylic acid esters include benzyl (meth)acrylate and phenoxyethyl (meth)acrylate. Among these aromatic group-containing (meth)acrylic acid esters, more preferred is benzyl (meth)acrylate.

As the hydrophobic monomer (b), two or more kinds of monomers described above may be used, and a combination of the styrene-based monomer and the aromatic group-containing (meth)acrylic acid ester may also be used.

[(c) Macromonomer]

The macromonomer (c) is in the form of a compound containing a polymerizable functional group at one terminal end thereof and having a number-average molecular weight of not less than 500 and not more than 100,000, and is preferably used as a monomer component of the water-insoluble polymer from the viewpoint of improving dispersion stability of the pigment-containing polymer particles in the ink. The polymerizable functional group bonded to one terminal end of the macromonomer is preferably an acryloyloxy group or a methacryloyloxy group, and more preferably a methacryloyloxy group.

The macromonomer (c) preferably has a number-average molecular weight of not less than 1,000 and not more than 10,000. Meanwhile, the number-average molecular weight of the macromonomer may be measured by gel permeation chromatography using chloroform containing 1 mmol/L of dodecyl dimethylamine as a solvent and using polystyrene as a reference standard substance.

As the macromonomer (c), from the viewpoint of improving dispersion stability of the pigment-containing polymer particles in the ink, there are preferably used an aromatic group-containing monomer-based macromonomer and a silicone-based macromonomer. Among these macromonomers, more preferred is the aromatic group-containing monomer-based macromonomer.

Examples of an aromatic group-containing monomer constituting the aromatic group-containing monomer-based macromonomer include those aromatic group-containing monomers as described with respect to the above hydrophobic monomer (b). Among these aromatic group-containing monomers, preferred are styrene and benzyl (meth)acrylate, and more preferred is styrene.

Specific examples of the styrene-based macromonomer include "AS-6(S)", "AN-6(S)" and "HS-6(S)" (tradenames all available from Toagosei Co., Ltd.), etc.

Examples of the silicone-based macromonomer include organopolysiloxanes containing a polymerizable functional group bonded to one terminal end thereof, etc.

[(d) Nonionic Monomer]

From the viewpoint of improving dispersion stability of the pigment-containing polymer particles in the ink, it is preferred that a nonionic monomer (d) (hereinafter also referred to merely as a "component (d)") is further used as a monomer component of the water-insoluble polymer. More specifically, the water-insoluble polymer further contains a constitutional unit derived from the component (d).

Examples of the component (d) include 2-hydroxyethyl (meth)acrylate, 3-hydroxypropyl (meth)acrylate, polyalkylene glycol (meth)acrylates such as polypropylene glycol (n=2 to 30 wherein n represents an average molar number of addition of oxyalkylene groups: hereinafter defined in the same way) (meth)acrylate and polyethylene glycol (n=2 to 30) (meth) acrylate, alkoxy polyalkylene glycol (meth) acrylates such as methoxy polyethylene glycol (n=1 to 30) (meth)acrylate, and aralkoxy polyalkylene glycol (meth) acrylates such as phenoxy (ethylene glycol/propylene glycol copolymer) (n=1 to 30 in which n for ethylene glycol: 1 to 29) (meth)acrylate.

Specific examples of commercially available products of the component (d) include "NK ESTER M-20G", "NK ESTER M-40G", "NK ESTER M-90G", "NK ESTER M-230G" and the like all available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400" and the like, "BLEMMER PP-500", "BLEMMER PP-800", "BLEMMER PP-1000" and the like, "BLEMMER AP-150", "BLEMMER AP-400", "BLEMMER AP-550" and the like, "BLEMMER 50PEP-300", "BLEMMER 50POEP-800B", "BLEMMER 43PAPE-600B" and the like all available from NOF Corporation.

These components (a) to (d) may be respectively used alone or in the form of a mixture of any two or more thereof.

(Contents of Respective Components or Constitutional Units in Monomer Mixture or Water-Insoluble Polymer)

Upon production of the water-insoluble polymer, the contents of the above components (a) and (b) in the monomer mixture (contents of non-neutralized components; hereinafter defined in the same way) or the contents of the constitutional units derived from the components (a) and (b) in the water-insoluble polymer are as follows from the viewpoint of improving dispersion stability of the pigment-containing polymer particles in the ink.

The content of the component (a) is preferably not less than 5% by mass, more preferably not less than 8% by mass and even more preferably not less than 10% by mass, and is also preferably not more than 45% by mass, more preferably not more than 35% by mass, even more preferably not more than 30% by mass and further even more preferably not more than 25% by mass.

The content of the component (b) is preferably not less than 35% by mass, more preferably not less than 40% by mass and even more preferably not less than 45% by mass, and is also preferably not more than 90% by mass, more preferably not more than 80% by mass, even more preferably not more than 75% by mass and further even more preferably not more than 60% by mass.

In the case where the component (c) and/or the component (d) are further included in addition to the aforementioned components (a) and (b), upon production of the water-insoluble polymer, the contents of the components (a) to (d) in the monomer mixture or the contents of the constitutional units derived from the components (a) to (d) in the water-insoluble polymer are as follows from the viewpoint of improving dispersion stability of the pigment-containing polymer particles in the ink.

The content of the component (a) is preferably not less than 3% by mass, more preferably not less than 5% by mass and even more preferably not less than 7% by mass, and is also preferably not more than 30% by mass, more preferably not more than 25% by mass and even more preferably not more than 20% by mass.

The content of the component (b) is preferably not less than 25% by mass, more preferably not less than 30% by mass, even more preferably not less than 35% by mass and further even more preferably not less than 40% by mass, and is also preferably not more than 60% by mass, more preferably not more than 55% by mass and even more preferably not more than 50% by mass.

In the case where the component (c) is further included, the content of the component (c) is preferably not less than 5% by mass, more preferably not less than 10% by mass and even more preferably not less than 15% by mass, and is also preferably not more than 30% by mass, more preferably not more than 25% by mass and even more preferably not more than 20% by mass.

In the case where the component (d) is further included, the content of the component (d) is preferably not less than 5% by mass, more preferably not less than 10% by mass, even more preferably not less than 15% by mass and further even more preferably not less than 20% by mass, and is also preferably not more than 40% by mass, more preferably not more than 35% by mass and even more preferably not more than 30% by mass.

The mass ratio [component (a)/component (b)] (i.e., the mass ratio of the component (a) to the component (b)) is preferably not less than 0.05, more preferably not less than 0.15 and even more preferably not less than 0.25, and is also preferably not more than 1.2, more preferably not more than 0.80 and even more preferably not more than 0.50.

In addition, in the case where the component (c) is further included, the mass ratio [component (a)/[component (b)+component (c)]] (i.e., the mass ratio of the component (a) to a sum of the component (b) and the component (c)) is preferably not less than 0.01, more preferably not less than 0.05 and even more preferably not less than 0.10, and is also preferably not more than 1, more preferably not more than 0.60 and even more preferably not more than 0.40.

(Production of Water-Insoluble Polymer)

The aforementioned water-insoluble polymer may be produced by copolymerizing the aforementioned monomer mixture by known polymerization methods such as a bulk polymerization method, a solution polymerization method, a suspension polymerization method and an emulsion polymerization method. Among these polymerization methods, preferred is the solution polymerization method.

The solvent used in the solution polymerization method is not particularly limited, and is preferably a polar organic solvent such as aliphatic alcohols having 1 to 3 carbon atoms, ketones, ethers and esters. Specific examples of the solvent include methanol, ethanol, acetone and methyl ethyl ketone. Of these solvents, preferred is methyl ethyl ketone.

The polymerization may be carried out in the presence of a polymerization initiator or a chain transfer agent. As the polymerization initiator, preferred are azo compounds, and more preferred is 2,2'-azobis(2,4-dimethylvaleronitrile). As the chain transfer agent, preferred are mercaptans, and more preferred is 2-mercaptoethanol.

The preferred polymerization conditions may vary depending upon the kind of polymerization initiator used, etc. The polymerization temperature is preferably not lower than 50° C. and not higher than 90° C., and the polymerization time is preferably not less than 1 hour and not more than 20 hours. In addition, the polymerization is preferably conducted in a nitrogen gas atmosphere or an atmosphere of an inert gas such as argon.

After completion of the polymerization reaction, the polymer thus produced may be isolated from the reaction solution by conventionally known methods such as reprecipitation and removal of solvent by distillation. In addition, the thus obtained polymer may be subjected to reprecipitation, membrane separation, chromatography, extraction, etc., for removing unreacted monomers, etc., therefrom.

The water-insoluble polymer is preferably used as such in the form of a water-insoluble polymer solution without removing the solvent used in the polymerization reaction therefrom in order to use the organic solvent contained therein as an organic solvent in the below-mentioned step I from the viewpoint of enhancing productivity of the below-mentioned water dispersion of the pigment-containing polymer particles.

The solid content of the water-insoluble polymer solution is preferably not less than 30% by mass and more preferably not less than 40% by mass, and is also preferably not more than 70% by mass and more preferably not more than 65% by mass, from the viewpoint of enhancing productivity of the water dispersion of the pigment-containing polymer particles.

The weight-average molecular weight of the water-insoluble polymer used in the present invention is preferably not less than 5,000, more preferably not less than 10,000 and even more preferably not less than 20,000, and is also preferably not more than 500,000, more preferably not more than 400,000, even more preferably not more than 300,000, further even more preferably not more than 200,000 and still further even more preferably not more than 100,000, from the viewpoint of improving dispersion stability of the pigment-containing polymer particles in the ink as well as from the viewpoint of obtaining good printed materials that are free of roller transfer contamination and intercolor bleeding.

Meanwhile, the weight-average molecular weight may be measured by the method described in Examples below.

[Production of Pigment-Containing Polymer Particles]

The water-based ink of the present invention may include water-insoluble polymer particles containing the pigment (A).

The water-insoluble polymer particles containing the pigment (A) (hereinafter also referred to merely as "pigment-containing polymer particles") can be efficiently produced in the form of a water dispersion thereof by the process including the following steps I and II.

Step I: subjecting a mixture containing the water-insoluble polymer, the organic solvent, the pigment (A) and water (hereinafter also referred to merely as a "pigment mixture") to dispersion treatment to obtain a dispersion of the pigment-containing polymer particles; and Step II: removing the aforementioned organic solvent from the dispersion obtained in the step I to obtain a water dispersion of the pigment-containing polymer particles (hereinafter also referred to merely as a "pigment water dispersion").

(Step I)

The step I is preferably conducted by the method in which the water-insoluble polymer is first dissolved in the organic solvent, and then the pigment (A) and water, if required, together with a neutralizing agent, a surfactant and the like, are added and mixed in the resulting organic solvent solution to obtain a dispersion of an oil-in-water type. The order of addition of the respective components added to the water-insoluble polymer organic solvent solution is not particularly limited, and it is preferred that water, the neutralizing agent and the pigment (A) are successively added in this order.

The organic solvent in which the water-insoluble polymer can be dissolved is not particularly limited, and is preferably selected from aliphatic alcohols having 1 to 3 carbon atoms, ketones, ethers, esters and the like. Of these organic solvents, from the viewpoint of improving wettability to the pigment (A), solubility of the water-insoluble polymer therein and adsorptivity of the water-insoluble polymer to the pigment (A), more preferred are ketones having not less than 4 and not more than 8 carbon atoms, even more preferred are methyl ethyl ketone and methyl isobutyl ketone, and further even more preferred is methyl ethyl ketone. When the water-insoluble polymer is synthesized by the solution polymerization method, the solvent used in the polymerization method may be used as such in the step I.

(Neutralization)

In the case where the water-insoluble polymer is an anionic polymer, an anionic group contained in the water-insoluble polymer may be neutralized using a neutralizing agent. When using the neutralizing agent, the pH value of the dispersion of the water-insoluble polymer after being neutralized with the neutralizing agent is preferably controlled to not less than 7 and not more than 11.

Examples of the neutralizing agent include hydroxides of alkali metals, ammonia and organic amines. Specific examples of the hydroxides of alkali metals include lithium hydroxide, sodium hydroxide, potassium hydroxide and cesium hydroxide. Among these hydroxides of alkali metals, preferred is sodium hydroxide. Specific examples of the organic amines include trimethylamine, ethylamine, diethylamine, triethylamine and triethanolamine.

As the neutralizing agent, from the viewpoint of improving ejection stability and storage stability of the ink, preferred are the hydroxides of alkali metals and ammonia, and more preferred is a combination of sodium hydroxide and ammonia. In addition, the water-insoluble polymer may be previously neutralized.

The neutralizing agent is preferably used in the form of an aqueous neutralizing agent solution from the viewpoint of accelerating neutralization of the polymer in a sufficient and uniform manner. From the same viewpoint as described above, the concentration of the aqueous neutralizing agent solution is preferably not less than 3% by mass, more preferably not less than 10% by mass and even more preferably not less than 15% by mass, and is also preferably not more than 30% by mass and more preferably not more than 25% by mass.

The degree of neutralization of the anionic group in the water-insoluble polymer is preferably not less than 30 mol %, more preferably not less than 40 mol % and even more preferably not less than 50 mol %, and is also preferably not more than 300 mol %, more preferably not more than 200 mol % and even more preferably not more than 150 mol %, from the viewpoint of improving dispersion stability and storage stability of the pigment-containing polymer particles in the pigment water dispersion and the ink.

The degree of neutralization as described herein means the value obtained by dividing a mole equivalent of the neutralizing agent by a molar amount of the anionic group in the water-insoluble polymer. Inherently, the degree of neutralization of the polymer does not exceed 100 mol %. However, in the present invention, since the degree of neutralization of the polymer is calculated from an amount of the neutralizing agent used, if the neutralizing agent is used in an excessive amount relative to the polymer, the degree of neutralization of the polymer will exceed 100 mol %. The aforementioned anionic group may include a carboxy group of the ionic monomer, etc.

(Contents of Respective Components in Pigment Mixture)

The content of the pigment (A) in the pigment mixture used in the step I is preferably not less than 10% by mass, more preferably not less than 12% by mass and even more preferably not less than 14% by mass, and is also preferably not more than 30% by mass, more preferably not more than 25% by mass and even more preferably not more than 20% by mass, from the viewpoint of improving dispersion stability of the pigment water dispersion as well as from the viewpoint of obtaining good printed materials that are free of roller transfer contamination and intercolor bleeding.

The content of the water-insoluble polymer in the pigment mixture is preferably not less than 2.0% by mass, more preferably not less than 4.0% by mass and even more preferably not less than 5.0% by mass, and is also preferably not more than 15% by mass, more preferably not more than 12% by mass and even more preferably not more than 10% by mass, from the viewpoint of improving dispersion stability of the pigment water dispersion as well as from the viewpoint of obtaining good printed materials that are free of roller transfer contamination and intercolor bleeding.

The content of the organic solvent in the pigment mixture is preferably not less than 10% by mass, more preferably not less than 12% by mass and even more preferably not less than 15% by mass, and is also preferably not more than 35% by mass, more preferably not more than 30% by mass and even more preferably not more than 25% by mass, from the viewpoint of improving wettability to the pigment (A) and adsorptivity of the water-insoluble polymer to the pigment.

The content of water in the pigment mixture is preferably not less than 40% by mass, more preferably not less than 45% by mass and even more preferably not less than 50% by mass, and is also preferably not more than 70% by mass, more preferably not more than 65% by mass and even more preferably not more than 60% by mass, from the viewpoint of improving dispersion stability of the pigment water dispersion as well as from the viewpoint of enhancing productivity of the pigment water dispersion.

The mass ratio of the pigment (A) to the water-insoluble polymer (a) [(A)/(a)] in the pigment mixture is preferably not less than 30/70, more preferably not less than 40/60, even more preferably not less than 50/50 and further even more preferably not less than 60/40, and is also preferably not more than 90/10, more preferably not more than 80/20 and even more preferably not more than 75/25, from the viewpoint of improving dispersion stability of the pigment water dispersion as well as from the viewpoint of obtaining good printed materials that are free of roller transfer contamination and intercolor bleeding.

(Dispersion Treatment of Pigment Mixture)

In the step I, the pigment mixture is subjected to dispersion treatment to obtain a dispersion of the pigment-containing polymer particles. The dispersing method of obtaining the aforementioned dispersion is not particularly limited. The pigment particles may be atomized into fine particles having a desired average particle size only by a substantial dispersion treatment. However, it is preferred that the pigment mixture is first subjected to a preliminary dispersion treatment, and then to the substantial dispersion treatment by applying a shear stress thereto so as to control the average particle size of the obtained pigment particles to a desired value.

The temperature used in the preliminary dispersion treatment in the step I is preferably not lower than 0° C., and is also preferably not higher than 40° C., more preferably not higher than 30° C. and even more preferably not higher than 25° C. The dispersing time is preferably not less than 0.5 hour and more preferably not less than 0.8 hour, and is also preferably not more than 30 hours, more preferably not more than 10 hours and even more preferably not more than 5 hours.

When subjecting the pigment mixture to the preliminary dispersion treatment, there may be used ordinary mixing and stirring devices such as anchor blades and disper blades. Of these devices, preferred are high-speed stirring mixers.

As the means for applying a shear stress to the pigment mixture in the substantial dispersion treatment, there may be used, for example, kneading machines such as roll mills and kneaders, high-pressure homogenizers such as "Microfluidizer" available from Microfluidics Corporation, and media-type dispersers such as paint shakers and beads mills. Examples of the commercially available media-type dispersers include "Ultra Apex Mill" available from Kotobuki Industries Co., Ltd., and "Pico Mill" available from Asada Iron Works Co., Ltd. These devices may be used in combination of any two or more thereof. Among these devices, the high-pressure homogenizers are preferably used from the viewpoint of reducing the particle size of the pigment.

When conducting the substantial dispersion treatment using the high-pressure homogenizers, it is possible to adjust the particle size of the pigment to a desired value by controlling pressure used in the substantial dispersion treatment or frequency of passing the dispersion through the dispersing devices.

The pressure used in the substantial dispersion treatment is preferably not less than 60 MPa, more preferably not less than 100 MPa and even more preferably not less than 130 MPa, and is also preferably not more than 200 MPa and more preferably not more than 180 MPa, from the viewpoint of enhancing productivity and cost efficiency.

The frequency of passing the dispersion through the dispersing devices is preferably not less than 3 and more preferably not less than 10, and is also preferably not more than 30 and more preferably not more than 25.

(Step II)

In the step II, the organic solvent is removed from the dispersion obtained in the step I by any conventionally known methods to obtain a water dispersion of the pigment-containing polymer particles (pigment water dispersion). The organic solvent is preferably substantially completely removed from the thus obtained pigment water dispersion. However, the residual organic solvent may be present in the pigment water dispersion unless the objects and advantageous effects of the present invention are adversely affected by the residual organic solvent. The content of the residual organic solvent in the pigment water dispersion is preferably not more than 0.1% by weight and more preferably not more than 0.01% by weight.

In addition, if required, the pigment water dispersion may be subjected to heating and stirring treatments before removing the organic solvent therefrom by distillation.

In the thus-obtained pigment water dispersion, the solid water-insoluble polymer particles containing the pigment (A) are dispersed in a dispersing medium containing water as a main medium. The configuration of the pigment-containing polymer particles is not particularly limited, and the pigment-containing polymer particles may have any configuration as long as the particles are formed from at least the pigment (A) and the water-insoluble polymer. Examples of the configuration of the pigment-containing polymer particles include the particle configuration in which the pigment (A) is enclosed or encapsulated in the water-insoluble polymer, the particle configuration in which the pigment (A) is uniformly dispersed in the water-insoluble polymer, and the particle configuration in which the pigment (A) is exposed onto a surface of the respective water-insoluble polymer particles, as well as a mixture of these configurations.

The concentration of the non-volatile components (solid content) in the resulting pigment water dispersion is preferably not less than 10% by mass and more preferably not less than 15% by mass, and is also preferably not more than 30% by mass and more preferably not more than 25% by mass, from the viewpoint of improving dispersion stability of the pigment water dispersion as well as from the viewpoint of facilitating production of the water-based ink.

Meanwhile, the solid content of the pigment water dispersion may be measured by the method described in Examples below.

The average particle size of the pigment-containing polymer particles in the pigment water dispersion is preferably not less than 40 nm, more preferably not less than 60 nm and even more preferably not less than 75 nm, and is also preferably not more than 150 nm, more preferably not more than 120 nm and even more preferably not more than 110 nm, from the viewpoint of suppressing formation of coarse particles and improving ejection stability of the water-based ink.

Meanwhile, the average particle size of the pigment-containing polymer particles may be measured by the method described in Examples below.

In addition, the average particle size of the pigment-containing polymer particles in the water-based ink is the same as the average particle size of the pigment-containing polymer particles in pigment water dispersion, and the preferred range of the average particle size of the pigment-containing polymer particles in the water-based ink is also the same as that of the average particle size of the pigment-containing polymer particles in pigment water dispersion.

<Organic Solvent (B)>

From the viewpoint of improving election stability of the water-based ink, the organic solvent (B) contains at least a glycol ether (b-1). The glycol ether (b-1) used in the organic solvent (B) has a viscosity of not less than 2.0 mPa·s and not more than 5.5 mPa·s as measured at 20° C., and a vapor pressure of not less than 0.03 hPa and not more than 6.0 hPa as measured at 20° C. Thus, since the glycol ether (b-1) has adequate viscosity, is excellent in flow characteristics and further exhibits adequate vapor pressure, it is possible to suppress drying of the ink and prevent formation of deposited aggregates of the ink in nozzles. For this reason, it is considered that the glycol ether (b-1) contributes to improvement in ejection stability of the ink upon conducting the high-speed printing at a printing speed of not less than 70 m/min. Also, since the viscosity and vapor pressure of the glycol ether (b-1) lie within respective adequate ranges, it is possible to prevent the ink from being insufficiently dried on the printed surface and therefore suppress occurrence of roller contamination and peeling or rub-off of the ink on the printed surface. As a result, it is considered that the resulting printed materials can exhibit good quality without roller transfer contamination and intercolor bleeding.

(Glycol Ether (b-1))

The viscosity of the glycol ether (b-1) as measured at 20° C. is preferably not less than 2.2 mPa·s, more preferably not less than 2.4 mPa·s and even more preferably not less than 2.6 mPa·s, and is also preferably not more than 5.0 mPa·s, more preferably not more than 4.5 mPa·s, even more preferably not more than 4.2 mPa·s, further even more preferably not more than 4.0 mPa·s and still further even more preferably not more than 3.5 mPa·s, from the viewpoint of imparting adequate viscosity to the water-based ink and improving ejection stability of the water-based ink. The term "viscosity" as used in the present invention means the viscosity determined using an E-type viscometer.

The vapor pressure of the glycol ether (b-1) as measured at 20° C. is preferably not less than 0.04 hPa, more preferably not less than 0.06 hPa and even more preferably not less than 0.08 hPa from the viewpoint of imparting adequate drying properties to the water-based ink as well as from the viewpoint of obtaining good printed materials that are free of roller transfer contamination and intercolor bleeding, and is also no more than 6.0 hPa, preferably not more than 5.0 hPa, more preferably not more than 4.5 hPa, even more preferably not more than 4.0 hPa and further even more preferably not more than 3.5 hPa from the viewpoint of suppressing formation of dry-thickened products of the ink within a print head, in particular, a line print head as well as deterioration in ejection stability of the ink. As the method of measuring the vapor pressure, there may be mentioned a stationery method, a gas flowing method, a boiling point measuring method, etc. The "vapor pressure" as used in the present invention means a saturated vapor pressure determined by the gas flowing method.

The boiling point of the glycol ether (b-1) is preferably not lower than 130° C., more preferably not lower than 135° C. and even more preferably not lower than 138° C., and is also preferably not higher than 215° C., more preferably not higher than 210° C. and even more preferably not higher than 200° C.

Meanwhile, the glycol ether (b-1) may be used alone or in the form of a mixture of any two or more kinds thereof. In the case where two or more glycol ethers are used as the glycol ether (b-1), the viscosity, vapor pressure and boiling point of the glycol ether (b-1) are each represented by a weighted mean value thereof which is weighted by contents (% by mass) of the respective glycol ethers constituting the glycol ether (b-1) in the water-based ink.

Specific examples of the glycol ether (b-1) include alkylene glycol monoalkyl ethers and alkylene glycol dialkyl ethers. Among these compounds, from the viewpoint of improving ejection stability of the water-based ink as well as from the viewpoint of obtaining good printed materials that are free of roller transfer contamination and intercolor bleeding, preferred are alkylene glycol monoalkyl ethers. The number of carbon atoms in an alkyl group of the alkylene glycol monoalkyl ethers is preferably not less than 1, more preferably not less than 2 and even more preferably not less than 3, and is also preferably not more than 6 and more preferably not more than 4. The alkyl group of the alkylene glycol monoalkyl ethers may be in the form of either a straight chain or a branched chain.

Specific examples of the alkylene glycol monoalkyl ethers include ethylene glycol ethyl ether, ethylene glycol isopropyl ether, ethylene glycol propyl ether, ethylene glycol butyl ether, diethylene glycol methyl ether, diethylene glycol ethyl ether, diethylene glycol isopropyl ether, diethylene glycol butyl ether, triethylene glycol methyl ether, triethylene glycol isobutyl ether, tetraethylene glycol methyl ether (boiling point: 158° C.), propylene glycol ethyl ether, dipropylene glycol butyl ether, dipropylene glycol methyl ether, tripropylene glycol methyl ether and tripropylene glycol butyl ether.

Of these alkylene glycol monoalkyl ethers, preferred is at least one compound selected from the group consisting of diethylene glycol methyl ether, ethylene glycol isopropyl ether, ethylene glycol propyl ether and diethylene glycol isopropyl ether, and more preferred is at least one compound selected from the group consisting of ethylene glycol isopropyl ether and diethylene glycol methyl ether.

(Organic Solvent (b-2) Other than Glycol Ether (b-1))

The organic solvent (B) preferably further contains an organic solvent (b-2) other than the glycol ether (b-1) from the viewpoint of improving storage stability and ejection stability of the ink.

Examples of the organic solvent (b-2) other than the glycol ether (b-1) include glycol ethers other than the glycol ether (b-1), alcohols, alkyl ethers of the alcohols, nitrogen-containing heterocyclic compounds such as N-methyl-2-pyrrolidone, amides, amines and sulfur-containing compounds. From the viewpoint of improving storage stability and ejection stability of the ink, as the organic solvent (b-2), preferred is at least one compound selected from the group consisting of alcohols and alkyl ethers of the alcohols which both have a boiling point of not lower than 90° C., and more preferred are polyhydric alcohols having a boiling point of not lower than 90° C. The organic solvent (b-2) other than the glycol ether (b-1) may be used alone or in the form of a mixture of any two or more kinds thereof.

The polyhydric alcohols having a boiling point of not lower than 90° C. are preferably in the form of a compound having a boiling point of lower than 250° C. Examples of the polyhydric alcohols having a boiling point of not lower than 90° C. and lower than 250° C. include 1,2-alkanediols such as ethylene glycol (boiling point (b.p.) 197° C.), propylene glycol (b.p. 188° C.), 1,2-butanediol (b.p. 193° C.), 1,2-pentanediol (b.p. 206° C.) and 1,2-hexanediol (b.p. 223° C.). Further examples of the polyhydric alcohols having a boiling point of not lower than 90° C. include diethylene glycol (b.p. 244° C.), polyethylene glycol, propylene glycol (b.p. 188° C.), dipropylene glycol (b.p. 232° C.), 1,3-propanediol (b.p. 210° C.), 1,3-butanediol (b.p. 208° C.), 1,4-butanediol (b.p. 230° C.), 3-methyl-1,3-butanediol (b.p. 203° C.), 1,5- pentanediol (b.p. 242° C.), 2-methyl-2,4-pentanediol (b.p. 196° C.), 1,2,6-hexanetriol (b.p. 178° C.), 1,2,4-butanetriol (b.p. 190° C.), 1,2,3-butanetriol (b.p. 175° C.) and petriol (b.p. 216° C.). Among these polyhydric alcohols, from the viewpoint of improving storage stability and ejection stability of the ink, preferred are 1,2-alkanediols, more preferred are 1,2-alkanediols having from 2 to 6 carbon atoms, and even more preferred is propylene glycol. In addition, it is also preferred that a compound having a boiling point of not lower than 250° C. such as 1,6-hexanediol (b.p. 250° C.), triethylene glycol (b.p. 285° C.), tripropylene glycol (b.p. 273° C.) and glycerin (b.p. 290° C.) is used in combination with the compound having a boiling point of lower than 250° C. From the viewpoint of improving ejection stability of the ink, it is preferred that the compound having a boiling point of lower than 250° C. is used in combination with glycerin, and it is more preferred that propylene glycol is used in combination with glycerin.

The content of the glycol ether (b-1) in the organic solvent (B) is preferably not less than 30% by mass, more preferably not less than 35% by mass and even more preferably not less than 45% by mass, and is also preferably not more than 90% by mass, more preferably not more than 80% by mass and even more preferably not more than 70% by mass.

The content of the organic solvent (b-2) in the organic solvent (B) is preferably not less than 20% by mass, more preferably not less than 30% by mass, even more preferably not less than 40% by mass and further even more preferably not less than 50% by mass, and is also preferably not more than 90% by mass, more preferably not more than 80% by mass and even more preferably not more than 70% by mass, from the viewpoint of improving storage stability and ejection stability of the ink.

<Surfactant (C)>

The water-based ink used in the present invention also contains a surfactant (C) from the viewpoint of suppressing increase in viscosity of the ink, improving ejection stability of the ink and obtaining good printed materials that are free of roller transfer contamination and intercolor bleeding.

From the same viewpoint as described above, the surfactant (C) is preferably a nonionic surfactant, and more preferably an acetylene glycol-based surfactant.

The acetylene glycol-based surfactant is preferably at least one compound selected from the group consisting of 2,4,7,9-tetramethyl-5-decyne-4,7-diol, 3,6-dimethyl-4-octyne-3,6-diol, 2,5-dimethyl-3-hexyne-2,5-diol, 2,5,8,11-tetramethyl-6-dodecyne-5,8-diol, 3,5-dimethyl-1-hexyne-3-ol and ethyleneoxide adducts (hereinafter also referred to merely as "EO adducts") of these compounds, more preferably at least one compound selected from the group consisting of 2,4,7,9-tetramethyl-5-decyne-4,7-diol, 3,6-dimethyl-4-octyne-3,6-diol, 2,5-dimethyl-3-hexyne-2,5-diol and EO adducts of these compounds, and even more preferably at least one compound selected from the group consisting of 2,4,7,9-tetramethyl-5-decyne-4,7-diol and EO adducts of the compound.

2,4,7,9-Tetramethyl-5-decyne-4,7-diol, 3,6-dimethyl-4-octyne-3,6-diol and 2,5-dimethyl-3-hexyne-2,5-diol can be synthesized by reacting acetylene with a ketone or an aldehyde corresponding to the aimed acetylene glycol, and may be produced, for example, by the method described in Takehiko Fujimoto, a fully revised edition "New Introduction to Surfactants" published by Sanyo Chemical Industries, Ltd., 1992, pp. 94-107, etc.

As the acetylene glycol-based surfactant, preferred are those compounds in which the average molar number of addition of ethyleneoxide (hereinafter also referred to merely as "EO") added to acetylene glycol is preferably not less than 5 and not more than 35, from the viewpoint of suppressing increase in viscosity of the ink.

The average molar number of addition of EO of the acetylene glycol-based surfactant is more preferably not less than 7, even more preferably not less than 8, further even more preferably not less than 9 and still further even more preferably not less than 9.5, and is also more preferably not more than 30 and even more preferably not more than 25.

The ethyleneoxide adducts (EO adducts) of acetylene glycol may be produced by subjecting the acetylene glycol obtained by the aforementioned method to addition reaction with ethyleneoxide such that the average molar number of addition of EO thereof is adjusted to a desired value.

Examples of commercially available products of the surfactant (C), in particular, the acetylene glycol-based surfactant, include "SURFYNOL 465" (average molar number of addition of EO: 10; HLB: 13) and "SURFYNOL 485" (average molar number of addition of EO: 30; HLB: 17) both available from Nissin Chemical Industry Co., Ltd., and Air Products & Chemicals, Inc., and "ACETYLENOL E81" (average molar number of addition of EO: 8.1; HLB: 12), "ACETYLENOL E100" (average molar number of addition of EO: 10; HLB: 13) and "ACETYLENOL E200" (average molar number of addition of EO: 20; HLB: 16) all available from Kawaken Fine Chemicals Co., Ltd., etc.

[Method for Producing Water-Based Ink]

The water-based ink of the present invention may be produced by mixing the pigment (A), the organic solvent (B), the surfactant (C) and water, if required, together with the other components, and then stirring the obtained mixture.

The contents of the respective components in the water-based ink according to the present invention as well as various properties of the water-based ink are as follows.

(Content of Pigment (A))

The content of the pigment (A) in the water-based ink is preferably not less than 1.0% by mass, more preferably not less than 2.0% by mass and even more preferably not less than 2.5% by mass from the viewpoint of enhancing printing density (optical density) of the water-based ink. Also, the content of the pigment (A) in the water-based ink is preferably not more than 15.0% by mass, more preferably not more than 10.0% by mass, even more preferably not more than 7.0% by mass and further even more preferably not more than 5.0% by mass from the viewpoint of reducing viscosity of the ink upon evaporating the solvent therefrom as well as from the viewpoint of improving ejection stability of the water-based ink and obtaining good printed materials that are free of roller transfer contamination and intercolor bleeding.

(Total Content of Pigment (A) and Water-Insoluble Polymer)

The total content of the pigment (A) and the water-insoluble polymer in the water-based ink is preferably not less than 2.0% by mass, more preferably not less than 2.5% by mass, even more preferably not less than 3.0% by mass and further even more preferably not less than 3.5% by mass, and is also preferably not more than 17.0% by mass, more preferably not more than 12.0% by mass, even more preferably not more than 10.0% by mass, further even more preferably not more than 8.0% by mass and still further even more preferably not more than 6.0% by mass.

(Mass Ratio [(A)/(a)])

The mass ratio of the pigment (A) to the water-insoluble polymer (a) [(A)/(a)] in the water-based ink is preferably not less than 30/70, more preferably not less than 40/60, even more preferably not less than 50/50 and further even more preferably not less than 60/40, and is also preferably not more than 90/10, more preferably not more than 80/20 and even more preferably not more than 75/25, from the viewpoint of improving dispersion stability of the pigment water dispersion as well as from the viewpoint of obtaining good printed materials that are free of roller transfer contamination and intercolor bleeding.

(Content of Organic Solvent (B))

The content of the organic solvent (B) in the water-based ink is preferably not less than 5% by mass, more preferably not less than 10% by mass, even more preferably not less than 15% by mass and further even more preferably not less than 20% by mass, and is also preferably not more than 60% by mass, more preferably not more than 50% by mass, even more preferably not more than 40% by mass and further even more preferably not more than 30% by mass, from the viewpoint of improving ejection stability of the ink.

The content of the glycol ether (b-1) in the water-based ink is preferably not less than 2% by mass, more preferably not less than 4% by mass and even more preferably not less than 8% by mass, and is also preferably not more than 20% by mass, more preferably not more than 18% by mass and even more preferably not more than 15% by mass, from the viewpoint of improving storage stability and ejection stability of the ink.

In the case where the organic solvent (B) contains the organic solvent (b-2) other than the glycol ether (b-1), the content of the organic solvent (b-2) in the water-based ink is preferably not less than 1% by mass, more preferably not less than 3% by mass, even more preferably not less than 5% by mass and further even more preferably not less than 7% by mass, and is also preferably not more than 18% by mass, more preferably not more than 16% by mass and even more preferably not more than 14% by mass, from the viewpoint of improving storage stability and ejection stability of the ink.

In the case where the organic solvent (B) contains the organic solvent (b-2) other than the glycol ether (b-1), the mass ratio of the glycol ether (b-1) to the organic solvent (b-2) [(b-1)/(b-2)] in the water-based ink is preferably not less than 20/80, more preferably not less than 30/70, even more preferably not less than 40/60 and further even more preferably not less than 45/55, and is also preferably not more than 80/20, more preferably not more than 70/30, even more preferably not more than 60/40 and further even more preferably not more than 50/50, from the viewpoint of improving storage stability and ejection stability of the ink as well as from the viewpoint of obtaining good printed materials that are free of roller transfer contamination and intercolor bleeding.

The content of the high-boiling organic solvent having a boiling point of not lower than 250° C. in the water-based ink is not more than 5% by mass. From the viewpoint of improving storage stability and ejection stability of the ink, the content of the high-boiling organic solvent having a boiling point of not lower than 250° C. in the water-based ink is preferably not more than 3% by mass, more preferably not more than 2% by mass and even more preferably not more than 1% by mass, and it is furthermore preferred that the water-based ink includes substantially no high-boiling organic solvent having a boiling point of not lower than 250° C.

(Content of Surfactant (C))

The content of the surfactant (C) in the water-based ink is preferably not less than 0.1% by mass, more preferably not less than 0.2% by mass and even more preferably not less than 0.3% by mass, and is also preferably not more than 5% by mass, more preferably not more than 3% by mass and even more preferably not more than 2.5% by mass, from the viewpoint of suppressing increase in viscosity of the ink and improving ejection stability of the ink as well as from the viewpoint of obtaining good printed materials that are free of roller transfer contamination and intercolor bleeding.

(Content of Water)

The content of water in the water-based ink is preferably not less than 20% by mass, more preferably not less than 30% by mass, even more preferably not less than 40% by mass and further even more preferably not less than 50% by mass, and is also preferably not more than 85% by mass, more preferably not more than 80% by mass and even more preferably not more than 75% by mass, from the viewpoint of improving ejection stability and storage stability of the ink as well as from the viewpoint of obtaining good printed materials that are free of roller transfer contamination and intercolor bleeding.

(Other Components)

The water-based ink of the present invention may also contain, in addition to the aforementioned components, various ordinary additives such as a humectant, a wetting agent, a penetrant, a dispersant, a surfactant other than the acetylene glycol-based surfactant, a viscosity controller, a defoaming agent, an antiseptic agent, a mildew-proof agent and a rust preventive.

(Properties of Water-Based Ink)

The viscosity of the water-based ink as measured at 32° C. is preferably not less than 2.0 mPa·s, more preferably not less than 3.0 mPa·s and even more preferably not less than 5.0 mPa·s, and is also preferably not more than 12 mPa·s, more preferably not more than 9.0 mPa·s and even more preferably not more than 7.0 mPa·s, from the viewpoint of improving ejection stability of the ink.

The pH value of the water-based ink is preferably not less than 7.0, more preferably not less than 8.0 and even more preferably not less than 8.5 from the viewpoint of improving storage stability and ejection stability of the ink as well as from the viewpoint of obtaining good printed materials that are free of roller transfer contamination and intercolor bleeding, and is also preferably not more than 11.0, more preferably not more than 10.0 and even more preferably not more than 9.5 from the viewpoint of improving resistance of members to the water-based ink and suppressing skin irritation.

Meanwhile, the pH value of the water-based ink may be measured by the method described in Examples below.

[Ink-Jet Printing Method]

The ink-jet printing method of the present invention includes a printing step of ejecting the water-based ink of the present invention onto a surface of a printing medium to print characters or images thereon, in which a printing speed upon printing the characters or images on the printing medium is not less than 70 m/min in terms of a transportation speed of the printing medium.

In the ink-jet printing method of the present invention, any of a serial print head, a line print head and the like may be used. However, in the ink-jet printing method of the present invention, it is preferred that the water-based ink of the present invention is ejected onto the printing medium using an ink-jet printing apparatus equipped with an ink-jet print head of a line head printing type. The ink-jet print head of a line head printing type is a print head of an elongated shape having a length near a width of the printing medium. In the ink-jet printing method using the ink-jet print head of a line head printing type, while keeping the print head stationery and moving the printing medium along a transporting direction thereof, ink droplets are ejected from openings of nozzles of the print head in association with the movement of the printing medium, whereby it is possible to allow the ink droplets to adhere onto the printing medium to print characters or images, etc., thereon.

Examples of the printing medium include a water absorbing printing medium such as plain paper and wood-free paper, a low-water absorbing printing medium such as art paper and coated paper, a non-water absorbing printing medium such as a synthetic resin film, etc. The printing medium is preferably in the form of a roll paper. The printing speed upon printing the characters or images on the printing medium is preferably is not less than 72 m/min in terms of a transportation speed of the printing medium. The transportation speed of the printing medium means a speed of movement of the printing medium in the direction along which the printing medium is transported upon the printing.

From the viewpoint of more suitably exhibiting the effect of suppressing roller transfer contamination and intercolor bleeding, the printing medium is preferably a low-water absorbing printing medium or a non-water absorbing printing medium. More specifically, the water absorption of the printing medium as measured in a pure water contact time of 100 milliseconds is not less than 0 $g/m^2$, and is also preferably not more than 10 $g/m^2$ and more preferably not more than 5 $g/m^2$. The water absorption of the printing medium may be measured using an automatic scanning absorptometer by the method described in Examples below.

The ink droplets may be ejected by a piezoelectric method using a piezoelectric-type print head. In the piezoelectric method, the ink droplets are ejected from a number of nozzles communicated with respective pressure chambers by vibrating a wall surface of the respective pressure chambers by means of a piezoelectric element. Meanwhile, in the present invention, there may also be used a thermal method using a thermal-type print head.

The voltage applied to the print head is preferably not less than 5 V, more preferably not less than 10 V and even more preferably not less than 15 V, and is also preferably not more than 40 V, more preferably not more than 35 V and even more preferably not more than 30 V, from the viewpoint of conducting the high-speed printing with a high efficiency, etc.

The drive frequency of the print head is preferably not less than 1 kHz, more preferably not less than 5 kHz, even more preferably not less than 10 kHz, further even more preferably not less than 20 kHz and still further even more preferably not less than 30 kHz, and is also preferably not more than 90 kHz, more preferably not more than 80 kHz, even more preferably not more than 70 kHz and further even more preferably not more than 60 kHz, from the viewpoint of conducting the high-speed printing with a high efficiency, etc. From the viewpoint of improving ejection stability of the ink, the drive frequency of the print head is furthermore preferably not more than 50 kHz, even furthermore preferably not more than 40 kHz and still even furthermore preferably not more than 35 kHz.

The amount of droplets of the ink ejected is preferably not less than 0.5 pL, more preferably not less than 1.0 pL, even more preferably not less than 1.5 pL and further even more preferably not less than 2 pL, and is also preferably not more than 30 pL, more preferably not more than 10 pL and even more preferably not more than 5 pL, as calculated per one droplet of the ink ejected, from the viewpoint of maintaining accuracy of an impact position of the ink droplets and improving image quality of the characters or images printed.

The print resolution of the characters or images printed is preferably not less than 1200 dpi. For example, in the case where the number of nozzle pores arranged per a length of a nozzle row in a line print head is 1200 dpi (dot/inch), when ejecting the ink onto a printing medium, a row of dots of the ink with a resolution of 1200 dpi which corresponds to the nozzle row is formed on the printing medium. When ejecting the ink droplets onto the printing medium while moving the printing medium, the dots with a resolution of 1200 dpi are formed along the direction of the nozzle row on the printing medium.

From the viewpoint of reducing viscosity of the ink and improving ejection stability of the ink, the inside temperature of an ink-ejection print head, in particular, a line print head, which is used in the printing step, is preferably controlled to not lower than 20° C., more preferably not lower than 25° C. and even more preferably not lower than 30° C., and is also preferably controlled to not higher than 45° C., more preferably not higher than 40° C. and even more preferably not higher than 38° C.

The temperature of the surface of the printing medium opposed to a region of the ink-ejection print head, preferably the line print head, from which the ink is ejected, is preferably controlled to not lower than 28° C., more preferably not lower than 30° C. and even more preferably not lower than 31° C., and is also preferably controlled to not higher than 45° C., more preferably not higher than 40° C. and even more preferably not higher than 38° C.

The amount of the water-based ink deposited on the printing medium is preferably not less than 0.1 $g/m^2$, and is also preferably not more than 25 $g/m^2$, more preferably not more than 20 $g/m^2$ and even more preferably not more than 10 $g/m^2$, in terms of a solid content thereof, from the viewpoint of improving image quality of the resulting printed materials and increasing the printing speed.

In the ink-jet printing method of the present invention, it is preferred that after conducting the printing step of ejecting the ink droplets onto the printing medium to print characters or images thereon, the step of drying the ink droplets impacted and deposited on the printing medium is conducted. More specifically, it is preferred that the ink-jet printing method of the present invention further includes a drying step of drying the water-based ink deposited on the printing medium after conducting the printing step.

In the drying step, the temperature of the surface of the printing medium is preferably controlled to not lower than 30° C., more preferably not lower than 40° C., even more preferably not lower than 50° C., further even more preferably not lower than 60° C. and still further even more preferably not lower than 65° C. from the viewpoint of obtaining good printed materials that are free of intercolor bleeding, and is also preferably controlled to not higher than 200° C., more preferably not higher than 150° C., even more preferably not higher than 120° C. and further even more preferably not higher than 90° C. from the viewpoint of suppressing deformation of the printing medium owing to heat applied thereto and saving energy consumed.

With respect to the aforementioned embodiments, the present invention further provides the following aspects relating to the ink-jet printing method and the water-based ink.

<1> An ink-jet printing method including a printing step of ejecting a water-based ink onto a surface of a printing medium to print characters or images thereon, in which:

the water-based ink includes a pigment (A), an organic solvent (B), a surfactant (C) and water;

the organic solvent (B) includes at least a glycol ether (b-1), and the glycol ether (b-1) has a viscosity of not less than 2.0 mPa·s and not more than 5.5 mPa·s as measured at 20° C. and a vapor pressure of not less than 0.03 hPa and not more than 6.0 hPa as measured at 20° C.;

a content of a high-boiling organic solvent having a boiling point of not lower than 250° C. in the water-based ink is not more than 5% by mass; and a printing speed upon printing the characters or images on the printing medium is not less than 70 m/min in terms of a transportation speed of the printing medium.

<2> The ink-jet printing method according to the aspect <1>, wherein the pigment (A) is present in the form of pigment-containing water insoluble polymer particles in the water-based ink.

<3> The ink-jet printing method according to the aspect <1> or <2>, wherein the water-insoluble polymer is a vinyl-based polymer that contains a constitutional unit derived from (a) an ionic monomer and a constitutional unit derived from (b) a hydrophobic monomer.

<4> The ink-jet printing method according to the aspect <3>, wherein the water-insoluble polymer further contains a constitutional unit derived from (c) a macromonomer.

<5> The ink-jet printing method according to the aspect <3> or <4>, wherein the water-insoluble polymer further contains a constitutional unit derived from (d) a nonionic monomer.

<6> The ink-jet printing method according to any one of the aspects <3> to <5>, wherein a content of the constitutional unit derived from the ionic monomer (a) in the water-insoluble polymer is preferably not less than 5% by mass, more preferably not less than 8% by mass and even more preferably not less than 10% by mass, and is also preferably not more than 45% by mass, more preferably not more than 35% by mass, even more preferably not more than 30% by mass and further even more preferably not more than 25% by mass.

<7> The ink-jet printing method according to any one of the aspects <3> to <6>, wherein a content of the constitutional unit derived from the hydrophobic monomer (b) in the water-insoluble polymer is preferably not less than 35% by mass, more preferably not less than 40% by mass and even more preferably not less than 45% by mass, and is also preferably not more than 90% by mass, more preferably not more than 80% by mass, even more preferably not more than 75% by mass and further even more preferably not more than 60% by mass.

<8> The ink-jet printing method according to any one of the aspects <2> to <7>, wherein a weight-average molecular weight of the water-insoluble polymer is preferably not less than 5,000, more preferably not less than 10,000 and even more preferably not less than 20,000, and is also preferably not more than 500,000, more preferably not more than 400,000, even more preferably not more than 300,000, further even more preferably not more than 200,000 and still further even more preferably not more than 100,000.

<9> The ink-jet printing method according to any one of the aspects <2> to <8>, wherein a mass ratio of the pigment (A) to the water-insoluble polymer (a) [(A)/(a)] in the water-based ink is preferably not less than 30/70, more preferably not less than 40/60, even more preferably not less than 50/50 and further even more preferably not less than 60/40, and is also preferably not more than 90/10, more preferably not more than 80/20 and even more preferably not more than 75/25.

<10> The ink-jet printing method according to any one of the aspects <1> to <9>, wherein a viscosity of the glycol ether (b-1) as measured at 20° C. is preferably not less than 2.2 mPa·s, more preferably not less than 2.4 mPa·s and even more preferably not less than 2.6 mPa·s, and is also preferably not more than 5.0 mPa·s, more preferably not more than 4.5 mPa·s, even more preferably not more than 4.2 mPa·s, further even more preferably not more than 4.0 mPa·s and still further even more preferably not more than 3.5 mPa·s.

<11> The ink-jet printing method according to any one of the aspects <1> to <10>, wherein a vapor pressure of the glycol ether (b-1) as measured at 20° C. is preferably not less than 0.04 hPa, more preferably not less than 0.06 hPa and even more preferably not less than 0.08 hPa, and is also not more than 6.0 hPa, preferably not more than 5.0 hPa, more preferably not more than 4.5 hPa, even more preferably not more than 4.0 hPa and further even more preferably not more than 3.5 hPa.

<12> The ink-jet printing method according to any one of the aspects <1> to <11>, wherein a boiling point of the glycol ether (b-1) is preferably not lower than 130° C., more preferably not lower than 135° C. and even more preferably not lower than 138° C., and is also preferably not higher than 215° C., more preferably not higher than 210° C. and even more preferably not higher than 200° C.

<13> The ink-jet printing method according to any one of the aspects <1> to <12>, wherein the glycol ether (b-1) is at least one compound selected from the group consisting of diethylene glycol methyl ether, ethylene glycol isopropyl ether, ethylene glycol propyl ether and diethylene glycol isopropyl ether.

<14> The ink-jet printing method according to any one of the aspects <1> to <13>, wherein the organic solvent (B) further includes an organic solvent (b-2) other than the glycol ether (b-1), and a mass ratio of the glycol ether (b-1) to the organic solvent (b-2) [(b-1)/(b-2)] in the water-based ink is preferably not less than 20/80, more preferably not less than 30/70, even more preferably not less than 40/60 and further even more preferably not less than 45/55, and is also preferably not more than 80/20, more preferably not more than 70/30, even more preferably not more than 60/40 and further even more preferably not more than 50/50.

<15> The ink-jet printing method according to any one of the aspects <1> to <14>, wherein the organic solvent (B) further includes a 1,2-alkanediol as the organic solvent (b-2) other than the glycol ether (b-1).

<16> The ink-jet printing method according to any one of the aspects <1> to <15>, wherein a content of the glycol ether (b-1) in the organic solvent (B) is preferably not less than 30% by mass, more preferably not less than 35% by mass and even more preferably not less than 45% by mass, and is also preferably not more than 90% by mass, more preferably not more than 80% by mass and even more preferably not more than 70% by mass.

<17> The ink-jet printing method according to any one of the aspects <1> to <16>, wherein the surfactant (C) is a nonionic surfactant.

<18> The ink-jet printing method according to any one of the aspects <1> to <17>, wherein the surfactant (C) is an acetylene glycol-based surfactant.

<19> The ink-jet printing method according to the aspect <18>, wherein the acetylene glycol-based surfactant is preferably at least one compound selected from the group consisting of 2,4,7,9-tetramethyl-5-decyne-4,7-diol, 3,6-dimethyl-4-octyne-3,6-diol, 2,5-dimethyl-3-hexyne-2,5-diol, 2,5,8,11-tetramethyl-6-dodecyne-5,8-diol, 3,5-dimethyl-1-hexyne-3-ol and EO adducts of these compounds, more preferably at least one compound selected from the group consisting of 2,4,7,9-tetramethyl-5-decyne-4,7-diol, 3,6-dimethyl-4-octyne-3,6-diol, 2,5-dimethyl-3-hexyne-2,5-diol and EO adducts of these compounds, and even more preferably at least one compound selected from the group consisting of 2,4,7,9-tetramethyl-5-decyne-4,7-diol and EO adducts of the compound.

<20> The ink-jet printing method according to the aspect <18> or <19>, wherein an average molar number of addition of ethyleneoxide in the acetylene glycol-based surfactant is preferably not less than 5, more preferably not less than 7, even more preferably not less than 8, further even more preferably not less than 9 and still further even more preferably not less than 9.5, and is also preferably not more than 35, more preferably not more than 30 and even more preferably not more than 25.

<21> The ink-jet printing method according to any one of the aspects <1> to <20>, wherein a content of the pigment (A) in the water-based ink is preferably not less than 1.0% by mass, more preferably not less than 2.0% by mass and even more preferably not less than 2.5% by mass, and is also preferably not more than 15.0% by mass, more preferably not more than 10.0% by mass, even more preferably not more than 7.0% by mass and further even more preferably not more than 5.0% by mass.

<22> The ink-jet printing method according to any one of the aspects <1> to <21>, wherein a total content of the pigment (A) and the water-insoluble polymer in the water-based ink is preferably not less than 2.0% by mass, more preferably not less than 2.5% by mass, even more preferably not less than 3.0% by mass and further even more preferably not less than 3.5% by mass, and is also preferably not more than 17.0% by mass, more preferably not more than 12.0% by mass, even more preferably not more than 10.0% by mass, further even more preferably not more than 8.0% by mass and still further even more preferably not more than 6.0% by mass.

<23> The ink-jet printing method according to any one of the aspects <1> to <22>, wherein a content of the organic solvent (B) in the water-based ink is preferably not less than 5% by mass, more preferably not less than 10% by mass, even more preferably not less than 15% by mass and further even more preferably not less than 20% by mass, and is also preferably not more than 60% by mass, more preferably not more than 50% by mass, even more preferably not more than 40% by mass and further even more preferably not more than 30% by mass.

<24> The ink-jet printing method according to any one of the aspects <1> to <23>, wherein a content of the glycol ether (b-1) in the water-based ink is preferably not less than 2% by mass, more preferably not less than 4% by mass and even more preferably not less than 8% by mass, and is also preferably not more than 20% by mass, more preferably not more than 18% by mass and even more preferably not more than 15% by mass.

<25> The ink-jet printing method according to any one of the aspects <1> to <24>, wherein a content of the high-boiling organic solvent having a boiling point of not lower than 250° C. in the water-based ink is preferably not more than 3% by mass, more preferably not more than 2% by mass and even more preferably not more than 1% by mass, and it is furthermore preferred that the water-based ink includes substantially no high-boiling organic solvent having a boiling point of not lower than 250° C.

<26> The ink-jet printing method according to any one of the aspects <1> to <25>, wherein a content of the surfactant (C) in the water-based ink is preferably not less than 0.1% by mass, more preferably not less than 0.2% by mass and even more preferably not less than 0.3% by mass, and is also preferably not more than 5% by mass, more preferably not more than 3% by mass and even more preferably not more than 2.5% by mass.

<27> The ink-jet printing method according to any one of the aspects <1> to <26>, wherein a print resolution of the characters or images printed is not less than 1200 dpi.

<28> The ink-jet printing method according to any one of the aspects <1> to <27>, wherein an inside temperature of an ink-ejection print head, preferably a line print head, which is used in the printing step, is preferably controlled to not lower than 20° C., more preferably not lower than 25° C. and even more preferably not lower than 30° C., and is also preferably controlled to not higher than 45° C., more preferably not higher than 40° C. and even more preferably not higher than 38° C.

<29> The ink-jet printing method according to any one of the aspects <1> to <28>, wherein a temperature of a surface of the printing medium is preferably controlled to not lower than 28° C., more preferably not lower than 30° C. and even more preferably not lower than 31° C., and is also preferably controlled to not higher than 45° C., more preferably not higher than 40° C. and even more preferably not higher than 38° C.

<30> The ink-jet printing method according to any one of the aspects <1> to <29>, wherein an amount of droplets of the water-based ink ejected is preferably not less than 0.5 pL, more preferably not less than 1.0 pL, even more preferably not less than 1.5 pL and further even more preferably not less than 2 pL, and is also preferably not more than 30 pL, more preferably not more than 10 pL and even more preferably not more than 5 pL, as calculated per one droplet of the water-based ink ejected.

<31> The ink-jet printing method according to any one of the aspects <1> to <30>, wherein a drive frequency of a print head is preferably not less than 1 kHz, more preferably not less than 5 kHz, even more preferably not less than 10 kHz, further even more preferably not less than 20 kHz and still further even more preferably not less than 30 kHz, and is also preferably not more than 90 kHz, more preferably not more than 80 kHz, even more preferably not more than 70 kHz, further even more preferably not more than 60 kHz, still further even more preferably not more than 50 kHz, still further even more preferably not more than 40 kHz and still further even more preferably not more than 35 kHz.

<32> The ink-jet printing method according to any one of the aspects <1> to <31>, further including a drying step of drying the water-based ink on the printing medium after the printing step, in which a temperature of the surface of the printing medium in the drying step is preferably controlled to not lower than 30° C., more preferably not lower than 40° C., even more preferably not lower than 50° C., further even more preferably not lower than 60° C. and still further even more preferably not lower than 65° C.

<33> The ink-jet printing method according to any one of the aspects <1> to <32>, further including a drying step of drying the water-based ink on the printing medium after the printing step, in which a temperature of the surface of the printing medium in the drying step is preferably controlled to not higher than 200° C., more preferably not higher than 150° C., even more preferably not higher than 120° C. and further even more preferably not higher than 90° C.

<34> The ink-jet printing method according to any one of the aspects <1> to <33>, wherein the printing medium has a water absorption of not less than 0 g/m$^2$, preferably not more than 10 g/m$^2$ and more preferably not more than 5 g/m$^2$ as measured in a pure water contact time of 100 milliseconds.

<35> The ink-jet printing method according to any one of the aspects <1> to <34>, wherein the printing medium is a roll paper.

<36> A water-based ink including a pigment (A), an organic solvent (B), a surfactant (C) and water, in which:

the organic solvent (B) includes at least a glycol ether (b-1), and the glycol ether (b-1) has a viscosity of not less than 2.0 mPa·s and not more than 5.5 mPa·s as measured at 20° C. and a vapor pressure of not less than 0.03 hPa and not more than 6.0 hPa as measured at 20° C.;

the glycol ether (b-1) is at least one compound selected from the group consisting of diethylene glycol methyl ether, ethylene glycol isopropyl ether, ethylene glycol propyl ether and diethylene glycol isopropyl ether; and a content of a high-boiling organic solvent having a boiling point of not lower than 250° C. in the water-based ink is not more than 5% by mass.

<37> A use of the water-based ink according to the aspect <36> in an ink-jet printing method.

EXAMPLES

In the following Production Example, Examples and Comparative Examples, the "part(s)" and "%" indicate "part(s) by mass" and "% by mass", respectively, unless otherwise specified.

(1) Measurement of Viscosity of Glycol Ether (b-1)

The viscosity of the glycol ether (b-1) was measured at 20° C. using an E-type viscometer "TV-25" (equipped with a standard cone rotor (1°34'×R24); rotating speed: 50 rpm) available from Toki Sangyo Co., Ltd.

(2) Measurement of Weight-Average Molecular Weights of Water-Insoluble Polymer

The weight-average molecular weight of the water-insoluble polymer was measured by gel permeation chromatography [GPC apparatus: "HLC-8120GPC" available from Tosoh Corporation; columns: "TSK-GEL, α-M"×2 available from Tosoh Corporation; flow rate: 1 mL/min] using N,N-dimethyl formamide in which phosphoric acid and lithium bromide were dissolved in amounts of 60 mmol/L and 50 mmol/L, respectively, as an eluent, and using a monodisperse polystyrene having a known molecular weight as a reference standard substance.

(3) Measurement of Average Particle Size of Pigment-Containing Polymer Particles The particles were subjected to cumulant analysis using a laser particle analyzing system "ELS-8000" available from Otsuka Electrics Co., Ltd., to measure an average particle size thereof. The measurement was conducted under the conditions including a temperature of 25° C., an angle between incident light and detector of 90° and a cumulative number of 100 times, and a refractive index of water (1.333) was input to the analyzing system as a refractive index of the dispersing medium. The measurement was conducted by adjusting a concentration of the dispersion to be measured to $5 \times 10^{-3}$% by mass in terms of a solid content thereof.

(4) Measurement of Solid Content of Water Dispersion

Sodium sulfate dried to constant weight in a desiccator was weighed in an amount of 10.0 g and charged in a 30 mL polypropylene reaction vessel (φ: 40 mm; height: 30 mm), and about 1.0 g of a sample to be measured was added to the reaction vessel. The contents of the reaction vessel were mixed and then accurately weighed. The resulting mixture was maintained in the reaction vessel at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample added.

(5) Measurement of pH of Water-Based Ink

The pH value of the water-based ink was measured at 25° C. using a bench-top pH meter "F-71" available from Horiba Ltd., equipped with a pH electrode "6337-10D" available from Horiba Ltd.

(6) Water Absorption of Printing Medium

The water absorption of the printing medium as measured by contacting the printing medium with pure water for 100 milliseconds was determined as follows. That is, using an automatic scanning absorptometer "KM500win" available from Kumagai Riki Kogyo Co., Ltd., an amount of pure water transferred to the printing medium when allowing the printing medium to contact with pure water at 23° C. under a relative humidity of 50% RH for 100 milliseconds was measured. The thus measured amount of pure water transferred to the printing medium was determined as the water absorption of the printing medium. The measuring conditions are as follows.

"Spiral Method"
  Contact time: 0.010 to 1.0 (sec)
  Pitch (mm): 7
  Length Per Sampling (degree): 86.29
  Start Radius (mm): 20
  End Radius (mm): 60
  Min Contact Time (ms): 10
  Max Contact Time (ms): 1000
  Sampling Pattern (1-50): 50
  Number of Sampling Points (>0): 19
"Square Head"
  Split Span (mm): 1
  Split Width (mm): 5

Production Example 1

Production of Water Dispersion of Pigment-Containing Polymer Particles (1) Synthesis of Water-Insoluble Polymer (1)

Fourteen (14) parts of methacrylic acid available from Wako Pure Chemical Industries, Ltd., 46 parts of styrene available from Wako Pure Chemical Industries, Ltd., 30 parts of a styrene macromonomer "AS-6S" (number-average molecular weight: 6,000; solid content: 50%) available from Toagosei Co., Ltd., 25 parts of polypropylene glycol methacrylate "BLEMMER PP-1000" available from NOF Corporation, and 25 parts of methyl ethyl ketone were mixed with each other to prepare 140 parts of a monomer mixture solution.

Eighteen (18) parts of methyl ethyl ketone and 0.03 part of 2-mercaptoethanol as a chain transfer agent as well as 10% (14 parts) of the monomer mixture solution prepared above were charged into a reaction vessel and mixed with each other, and then an inside atmosphere of the reaction vessel was fully replaced with a nitrogen gas.

Separately, a mixed solution prepared by mixing remaining 90% (126 parts) of the monomer mixture solution, 0.27 part of the above chain transfer agent, 42 parts of methyl ethyl ketone and 3 parts of 2,2'-azobis(2,4-dimethylvaleronitrile) "V-65" as a polymerization initiator available from Wako Pure Chemical Industries, Ltd., was charged into a dropping funnel. In a nitrogen atmosphere, the mixed solution in the reaction vessel was heated to 75° C. while stirring, and then the mixed solution in the dropping funnel was added dropwise thereinto over 3 hours. After the elapse of 2 hours from completion of the dropwise addition while maintaining the resulting mixed solution at a temperature of 75° C., a solution prepared by dissolving 3 parts of the aforementioned polymerization initiator in 5 parts of methyl ethyl ketone was added to the mixed solution, and the resulting reaction solution was further aged at 75° C. for 2 hours and at 80° C. for 2 hours to obtain a solution of a water-insoluble polymer (having a weight-average molecular weight of 60,000). The solid content of the thus obtained water-insoluble polymer solution was 60% by mass.

(2) Production of Water Dispersion of Pigment-Containing Polymer Particles

Thirty seven (37) parts of the water-insoluble polymer produced by drying the water-insoluble polymer solution obtained in the above (1) under reduced pressure were dissolved in 148 parts of methyl ethyl ketone. Added into the resulting solution were 12.5 parts of a 5N sodium hydroxide aqueous solution and 2 parts of a 25% ammonia aqueous solution both acting as a neutralizing agent. Furthermore, 372 parts of ion-exchanged water and then 100 parts of "C.I. Pigment Blue 15:3 (PB-15:3)" as a cyan pigment available from Dainichiseika Color & Chemicals Mfg. Co., Ltd., were added to the resulting mixed solution to prepare a pigment mixture. The degree of neutralization of the thus prepared pigment mixture was 100 mol %. The pigment mixture was mixed at 20° C. for 1 hour using a disper blade operated at 7000 rpm. The resulting dispersion was dispersed under a pressure of 180 MPa using a Microfluidizer "High-Pressure Homogenizer M-140K" available from Microfluidics Corporation by passing the dispersion through the device 15 times.

The thus obtained dispersion of the pigment-containing polymer particles was held at 60° C. under reduced pressure to remove methyl ethyl ketone therefrom, followed by further removing a part of water therefrom. The resulting dispersion was subjected to centrifugal separation, and a liquid layer portion separated therefrom was filtered through a filter "Minisart Syringe Filter" (pore diameter: 5 μm; material: cellulose acetate) available from Sartorius Inc., to remove coarse particles therefrom, thereby obtaining a water dispersion of the pigment-containing polymer particles. The solid content of the thus obtained water dispersion was 20% by mass, and the average particle size of the pigment-containing polymer particles was 100 nm.

Example 1

Production of Water-Based Ink

Twenty four (24) parts of the water dispersion of the pigment-containing polymer particles (solid content: 20% by mass; pigment: 3.5 parts; water-insoluble polymer: 1.3 parts) obtained in Production Example 1, 10.0 parts of ethylene glycol isopropyl ether, 1.0 part of glycerin, 10.0 parts of propylene glycol, 1.5 parts of an acetylene glycol-based surfactant "SURFYNOL 465" (tradename; an adduct of 2,4,7,9-tetramethyl-5-decyne-4,7-diol with 10 mol of ethyleneoxide) available from Air Products & Chemicals, Inc., and ion-exchanged water (a content of the ion-exchanged water was adjusted so that a total volume of the resulting solution became 100 parts) were mixed with each other. The thus obtained mixed solution was filtered through a filter "Minisart Syringe Filter" (pore diameter: 1.2 μm; material: cellulose acetate) available from Sartorius Inc., to prepare a water-based ink having a pH value of 8.8.

Examples 2 to 8 and Comparative Examples 1 to 3

Production of Water-Based Inks

The same procedure as in Example 1 was repeated except for using the solvents shown in Table 1 as the organic solvent (B) and changing the composition formulated to those shown in Table 2, thereby obtaining water-based inks.

TABLE 1

| Organic solvent (B) | | Boiling point (° C.) | Viscosity (mPa · s/20° C.) | Vapor pressure (hPa/20° C.) |
|---|---|---|---|---|
| (b-1) | Diethylene glycol methyl ether | 194 | 3.9 | 0.1 |
| | Ethylene glycol isopropyl ether | 142 | 2.8 | 3.1 |
| | Diethylene glycol isopropyl ether | 207 | 4.9 | 0.07 |
| (b-2) | Ethylene glycol methyl ether | 125 | 1.7 | 8.3 |
| | Diethylene glycol butyl ether | 231 | 6.5 | 0.01 |
| | Glycerin | 290 | >1000 | <0.01 |
| | Propylene glycol | 188 | 56 | 0.11 |

<Evaluation Tests of Water-Based Ink>
(Preparation of Ink-Jet Printed Materials)

The water-based ink produced in the respective Examples and Comparative Examples was loaded to a web printing-type print evaluation apparatus available from Trytech Co., Ltd., equipped with an ink-jet line print head "KJ4B-Z series (1200 dpi)" available from Kyocera Corporation under the environmental conditions of a temperature of 25±1° C. and a relative humidity of 30±5%.

The operating conditions of the print evaluation apparatus were set to a line head applied voltage of 26 V, an ejected ink droplet amount of 3 pL, a line head temperature of 32° C., a print resolution of 1200 dpi, a number of ink shots for flashing before being ejected of 200 shots and a negative pressure of −4.0 kPa. The drive frequency of the print head was 50 Hz. In addition, the transportation speed (printing speed) of the roll paper was set to 75 m/min, and the inside temperature of the line print head was set to the value shown in Table 2.

The printing medium "UPM Finesse Gloss" (water absorption: 3.1 g/m$^2$) in the form of a roll paper available from UPM was fitted to the print evaluation apparatus, and a printing command was transmitted to the print evaluation apparatus to conduct printing on the printing medium by an ink-jet printing method using the water-based ink. In addition, immediately after the printing, the printing medium thus printed was allowed to pass through a hot air dryer set to such a temperature as shown in Table 2, thereby obtaining a printed material. The thus obtained printed material was subjected to the following evaluation tests 1 to 3.

Test 1 (Ejection Stability)

After preparing the ink-jet printed material, operation of the print evaluation apparatus used was once stopped for 30 minutes, and the line print head thereof was exposed to atmospheric air. After the elapse of 30 minutes from the stopping, the printing operation of the print evaluation apparatus was started again to observe the condition of ejection of the ink upon preparing a first solid image printed material. The ejection recovery rate (%) was calculated according to the following formula to evaluate ejection stability of the ink.

Ejection Recovery Rate (%)=[(Ejection Area of Solid Image Printed after Exposure of Print Head to Atmospheric Air for 30 Minutes)/(Ejection Area of Solid Image Printed before Test)]×100

The larger the ejection recovery rate (%) becomes, the more excellent the ejection stability of the water-based ink is. When the value of the ejection recovery rate is not less than 65, the ink can be suitably used in practical applications.

Test 2 (Roller Transfer Contamination)

(1) Contamination of a surface of a stainless steel metal transportation roller disposed on the print evaluation apparatus as well as peeling (rub-off) of the pigment on the printed surface were evaluated according to the following evaluation ratings. The evaluation rating "+", "++" or "+++" indicates that the ink can be suitably used in practical applications, and the evaluation rating "++" or "+++" is preferable because the ink can be more sufficiently used in practical applications.

(Evaluation Ratings)

+++: Transportation roller was free of transfer contamination from printed portions, and no rub-off of the pigment was recognized on the printed surface.

++: Transportation roller was free of noticeable transfer contamination from printed portions, but slight rub-off of the pigment was recognized on the printed surface.

+: Transportation roller suffered from slight transfer contamination from printed portions, and slight rub-off of the pigment was recognized on the printed surface.

−: Transportation roller suffered from severe transfer contamination from printed portions, and much rub-off of the pigment was recognized on the printed surface.

(2) In addition, contamination of the surface of the stainless steel metal transportation roller disposed on the print evaluation apparatus was further evaluated by the following method.

Three print heads "KJ4B-Z series (1200 dpi)" available from Kyocera Corporation were successively installed, and the printing was conducted on the aforementioned printing medium "UPM Finesse Gloss" available from UPM while reducing an amount of ink duty (hereinafter also referred to merely as "duty amount") on the printing medium at the intervals of 5 from 300 to measure the duty amount and observe occurrence or non-occurrence of the roller contamination by naked eyes.

Assuming that the duty amount of 1200 dpi×3 pL per one of the aforementioned print heads was 100, the total value of the duty amounts of the three print heads was 300 in maximum. The duty amount was reduced at the intervals of 5 by suitably controlling the amount of droplets of the ink ejected, and the maximum duty amount in which no roller contamination occurred was regarded as a score of evaluation for the roller transfer contamination. As the score of evaluation for the roller transfer contamination is increased, occurrence of the roller contamination is more effectively prevented even under the condition in which a large amount of the ink is ejected, and the ink is more excellent in anti-roller transfer contamination characteristics.

Test 3 (Intercolor Bleeding)

In the ink composition used in the respective Examples and Comparative Examples, a yellow pigment C.I. Pigment Yellow 74 (PY 74) available from Dainichiseika Color & Chemicals Mfg. Co., Ltd., was used in place of the cyan pigment PB-15:3 available from Dainichiseika Color & Chemicals Mfg. Co., Ltd., to prepare a yellow ink. Solid image printing was conducted on a printing medium using the thus prepared yellow ink, and then within one second after the solid image printing, a character "a" was printed with the ink using the aforementioned cyan pigment on the portion of the printing medium where the solid image was printed using the yellow ink, to examine whether or not the character "a" printed was clearly recognized, thereby evaluating intercolor bleeding of the ink according to the following evaluation ratings. The evaluation rating "+", "++" or "+++" indicates that the ink can be suitably used in practical applications, and the evaluation rating "++" or "+++" is preferable because the ink can be more sufficiently used in practical applications.

(Evaluation Ratings)

+++: Character "a" was clearly recognized.

++: Increase in thickness of the character "a" was recognized, but the character "a" was still readable.

+: Portion where the character "a" was printed suffered from bleeding, and therefore the character "a" printed was considerably deteriorated in printing quality.

−: Portion where the character "a" was printed suffered from severe bleeding to such an extent that the character "a" printed was no longer readable.

TABLE 2-1

| | | | Examples | | | | | | | |
|---|---|---|---|---|---|---|---|---|---|---|
| | | | 1 | 2 | 3 | 4 | 5 | 6 | 7 | 8 |
| Ink composition formulated (part(s) by mass) | (A) | Pigment (PB 15:3) | 3.5 | 3.5 | 3.5 | 3.5 | 3.5 | 3.5 | 3.5 | 3.5 |
| | | Water-insoluble polymer | 1.3 | 1.3 | 1.3 | 1.3 | 1.3 | 1.3 | 1.3 | 1.3 |
| | (b-1) | Diethylene glycol methyl ether | — | 10.0 | — | — | — | — | — | — |
| | | Ethylene glycol isopropyl ether | 10.0 | — | — | 10.0 | 10.0 | 10.0 | 10.0 | 5.0 |
| | | Diethylene glycol isopropyl ether | — | — | 10.0 | — | — | — | — | — |
| | (b-2) | Ethylene glycol methyl ether | — | — | — | — | — | — | — | — |
| | | Diethylene glycol butyl ether | — | — | — | — | — | — | — | — |
| | | Glycerin | 1.0 | 1.0 | 1.0 | — | 1.0 | 1.0 | 1.0 | 1.0 |
| | | Propylene glycol | 10.0 | 10.0 | 10.0 | 11.0 | 10.0 | 10.0 | 10.0 | 15.0 |
| | (C) | SURFYNOL 465 | 1.5 | 1.5 | 1.5 | 1.5 | 1.5 | 1.5 | 1.5 | 1.5 |
| | | Ion-exchanged water | balance | balance | balance | balance | balance | balance | balance | balance |
| Printing conditions | | Inside temperature of line print head (° C.) | 32 | 32 | 32 | 32 | 25 | 32 | 32 | 32 |
| | | Transportation speed of roll paper (m/min) | 75 | 75 | 75 | 75 | 75 | 75 | 75 | 75 |
| | | Drying temperature (° C.) | 70 | 70 | 70 | 70 | 70 | 40 | 30 | 70 |
| Evaluation results | | Ejection stability (ejection recovery rate) (%) | 98 | 93 | 90 | 97 | 65 | 98 | 98 | 98 |

TABLE 2-1-continued

|  |  | Examples | | | | | | | |
|---|---|---|---|---|---|---|---|---|---|
|  |  | 1 | 2 | 3 | 4 | 5 | 6 | 7 | 8 |
| Occurrence of roller transfer (roller transfer contamination) | Evaluation | +++ | +++ | ++ | +++ | +++ | + | + | ++ |
|  | Score value | 210 | 210 | 180 | 210 | 210 | 120 | 120 | 180 |
| Intercolor bleeding (bleeding between colors) |  | +++ | +++ | ++ | ++ | +++ | ++ | + | +++ |

Note *1:
Defective Ejection

TABLE 2-2

|  |  |  | Comparative Examples | | |
|---|---|---|---|---|---|
|  |  |  | 1 | 2 | 3 |
| Ink composition formulated (part(s) by mass) | (A) | Pigment (PB 15:3) | 3.5 | 3.5 | 3.5 |
|  |  | Water-insoluble polymer | 1.3 | 1.3 | 1.3 |
|  | (b-1) | Diethylene glycol methyl ether | — | — | — |
|  |  | Ethylene glycol isopropyl ether | — | 10.0 | — |
|  |  | Diethylene glycol isopropyl ether | — | — | — |
|  | (b-2) | Ethylene glycol methyl ether | — | — | 10.0 |
|  |  | Diethylene glycol butyl ether | 10.0 | — | — |
|  |  | Glycerin | 1.0 | 8.0 | 1.0 |
|  |  | Propylene glycol | 10.0 | 2.0 | 10.0 |
|  | (C) | SURFYNOL 465 | 1.5 | 1.5 | 1.5 |
|  |  | Ion-exchanged water | balance | balance | balance |
| Printing conditions |  | Inside temperature of line print head (° C.) | 32 | 32 | 32 |
|  |  | Transportation speed of roll paper (m/min) | 75 | 75 | 75 |
|  |  | Drying temperature (° C.) | 70 | 70 | 70 |
| Evaluation results |  | Ejection stability (ejection recovery rate) (%) | 55 | 75 | 15 |
| Occurrence of roller transfer (roller transfer contamination) | Evaluation | | + | + | *1 |
|  | Score value | | 120 | 120 | *1 |
| Intercolor bleeding (bleeding between colors) | | | ++ | − | *1 |

Note
*1: Defective Ejection

From Table 2, it was confirmed that the water-based inks obtained in Examples 1 to 8 were excellent in ejection stability as compared with the water-based inks obtained in Comparative Examples 1 to 3. In addition, it was also confirmed that the water-based inks obtained according to the present invention were free of occurrence of roller transfer (i.e., roller transfer contamination) as well as intercolor bleeding, and were therefore excellent in printing performance.

The invention claimed is:

1. An ink jet printing method comprising a printing step of ejecting a water-based ink onto a surface of a printing medium to print characters or images thereon, in which:
   the water-based ink comprises a pigment (A), an organic solvent (B), a surfactant (C) and water;
   the organic solvent (B) comprises from 30% by mass to 90% by mass of a glycol ether (b-1), and the glycol ether (b-1) has a viscosity of not less than 2.0 mPa·s and not more than 5.5 mPa·s as measured at 20° C. and a vapor pressure of not less than 0.03 hPa and not more than 6.0 hPa as measured at 20° C.;
   a content of the glycol ether (b-1) in the water-based ink is from not less than 2% by mass to not more than 20% by mass;
   a content of high-boiling organic solvents having a boiling point of not lower than 250° C. in the water-based ink is not more than 5% by mass;
   a printing speed upon printing the characters or images on the printing medium is not less than 70 m/min in terms of a transportation speed of the printing medium,
      wherein the glycol ether (b-1) is at least one compound selected from the group consisting of diethylene glycol methyl ether, ethylene glycol isopropyl ether, ethylene glycol propyl ether and diethylene glycol isopropyl ether; and
   the organic solvent (B) further comprises a 1,2-alkanediol as an organic solvent (b-2) other than the glycol ether (b-1), wherein the organic solvent (b-2) is a combination of a compound having a boiling point of lower than 250° C. with glycerin.

2. The inkjet printing method according to claim 1, wherein the pigment (A) is present in the water-based ink in the form of pigment-containing water-insoluble polymer particles.

3. The inkjet printing method according to claim 1, wherein the surfactant (C) is an acetylene glycol-based surfactant.

4. The ink-jet printing method according to claim 1, wherein a print resolution of the characters or images printed is not less than 1200 dpi.

5. The ink-jet printing method according to claim 1, further comprising a drying step of drying the water-based ink on the printing medium after the printing step, in which the surface of the printing medium is heated to a temperature of not lower than 30° C. in the drying step.

6. The ink-jet printing method according to claim 1, wherein an inside temperature of an ink-ejection print head used in the printing step is not lower than 20° C. and not higher than 45° C.

7. The ink jet printing method according to claim 1, wherein an amount of droplets of the water-based ink ejected is not less than 0.5 pL, and not more than 30 pL, as calculated per one droplet of the water-based ink ejected.

8. The ink jet printing method according to claim 1, wherein a drive frequency of a print head is not less than 1 kHz and not more than 90 kHz.

9. The ink jet printing method according to claim 1, wherein the printing medium is a roll paper.

10. The ink-jet printing method according to claim 1, wherein the printing medium has a water absorption of not less than 0 g/m² and not more than 10 g/m² as measured in a pure water contact time of 100 milliseconds.

11. The inkjet printing method according to claim 1, wherein the surfactant (C) is a nonionic surfactant.

12. The inkjet printing method according to claim 1, wherein a mass ratio of the glycol ether (b-1) to the organic solvent (b-2) [(b-1)/(b-2)] in the water-based ink is not less than 20/80 and not more than 80/20.

13. The inkjet printing method according to claim 1, wherein a content of the surfactant (C) in the water-based ink is not less than 0.1% by mass and not more than 5% by mass.

14. The ink-jet printing method according to claim 1, wherein a content of water in the water-based ink is not less than 20% by mass and not more than 85% by mass.

15. The inkjet printing method according to claim 1, wherein the 1,2-alkanediol is a 1,2-alkanediol having from 2 to 6 carbon atoms.

16. The ink-jet printing method according to claim 1, wherein the surfactant (C) is an acetylene glycol-based surfactant in which the average molar number of addition of ethyleneoxide added to acetylene glycol is not less than 5 and not more than 35.

17. An inkjet printing, method, comprising a printing step of ejecting a water-based ink onto a surface of a printing medium to print characters or images thereon, in which:
the water-based ink comprises a pigment (A), an organic solvent (B), a surfactant (C) and water;
the organic solvent (B) comprises from 30% by mass to 90% by mass of a glycol ether (b-1), and the glycol ether (b-1) has a viscosity of not less than 2.0 mPa·s and not more than 5.5 mPa·s as measured at 20° C. and a vapor pressure of not less than 0.03 hPa and not more than 6.0 hPa as measured at 20° C.;
a content of the glycol ether (b-1) in the water-based ink is from not less than 8% by mass to not more than 20% by mass;
a content of high-boiling organic solvents having a boiling point of not lower than 250° C. in the water-based ink is not more than 5% by mass;
a printing speed upon printing the characters or images on the printing medium is not less than 70 m/min in terms of a transportation speed of the printing medium,
wherein the glycol ether (b-1) is at least one compound selected from the group consisting of diethylene glycol methyl ether, ethylene glycol isopropyl ether, ethylene glycol propyl ether and diethylene glycol isopropyl ether; and
the organic solvent (B) further comprises a 1,2-alkanediol as an organic solvent (b-2) other than the glycol ether (b-1), wherein the organic solvent (b-2) is a combination of a compound having a boiling point of lower than 250° C. with glycerin.

18. The inkjet printing method according to claim 17, wherein the 1,2-alkanediol is a 1,2-alkanediol having from 2 to 6 carbon atoms.

19. A water-based ink comprising a pigment (A), an organic solvent (B), a surfactant (C) and water, in which:
the organic solvent (B) comprises from 30% by mass to 90% by mass of a glycol ether (b-1), and the glycol ether (b-1) has a viscosity of not less than 2.0 mPa·s and not more than 5.5 mPa·s as measured at 20° C. and a vapor pressure of not less than 0.03 hPa and not more than 6.0 hPa as measured at 20° C.,
the glycol ether (b-1) is at least one compound selected from the group consisting, of diethylene glycol methyl ether, ethylene glycol isopropyl ether, ethylene glycol propyl ether and diethylene glycol isopropyl ether;
a content of the glycol ether (b-1) in the water-based ink is from not less than 2% by mass to not more than 20% by mass;
a content of high-boiling organic solvents having a boiling point of not lower than 250° C. in the water-based ink is not more than 5% by mass; and
the organic solvent (B) further comprises a 1,2-alkanediol as an organic solvent (b-2) other than the glycol ether (b-1), wherein the organic solvent (b-2) is a combination of a compound having a boiling point of lower than 250° C. with glycerin.

20. The water-based ink according to claim 19, wherein the 1,2-alkanediol is a 1,2-alkanediol having from 2 to 6 carbon atoms.

* * * * *